United States Patent
Lipkis et al.

(10) Patent No.: US 11,829,484 B2
(45) Date of Patent: Nov. 28, 2023

(54) CYBER RISK MINIMIZATION THROUGH QUANTITATIVE ANALYSIS OF AGGREGATE CONTROL EFFICACY

(71) Applicant: Monaco Risk Analytics Inc, Saratoga, CA (US)

(72) Inventors: James S. Lipkis, Saratoga, CA (US); William R. Frank, Westborough, MA (US)

(73) Assignee: Monaco Risk Analytics Inc, Saratoga, CA (US)

( * ) Notice: Subject to any disclaimer, the term of this patent is extended or adjusted under 35 U.S.C. 154(b) by 635 days.

(21) Appl. No.: 17/088,506

(22) Filed: Nov. 3, 2020

(65) Prior Publication Data
US 2021/0133331 A1 May 6, 2021

Related U.S. Application Data

(60) Provisional application No. 62/930,230, filed on Nov. 4, 2019.

(51) Int. Cl.
*G06F 21/57* (2013.01)
*H04L 9/40* (2022.01)
*G06Q 10/10* (2023.01)
*G06Q 10/047* (2023.01)
*G06Q 10/0631* (2023.01)
*G06Q 10/0639* (2023.01)
(Continued)

(52) U.S. Cl.
CPC ......... *G06F 21/577* (2013.01); *G06Q 10/047* (2013.01); *G06Q 10/0635* (2013.01); *G06Q 10/06312* (2013.01); *G06Q 10/06375* (2013.01); *G06Q 10/06395* (2013.01); *G06Q 10/06398* (2013.01); *G06Q 10/10* (2013.01); *H04L 63/145* (2013.01); *H04L 63/1483* (2013.01); *G06F 2221/034* (2013.01)

(58) Field of Classification Search
CPC ................ G06F 21/577; G06Q 10/047; G06Q 10/06312; G06Q 10/0635; G06Q 10/06395; G06Q 10/06398; G06Q 10/10; H04L 63/145; H04L 63/1483
USPC .......................................................... 726/25
See application file for complete search history.

(56) References Cited

U.S. PATENT DOCUMENTS 8,516,590 B1 8/2013 Ranadive et al.
9,596,266 B1 3/2017 Coleman et al.
(Continued)

OTHER PUBLICATIONS

KPMG, "Cyber risk modelling and quantification" Rethinking cyber attack likelihood quantifications, 2020, downloaded from https://assets.kpmg/content/dam/kpmg/uk/pdf/2020/11/cyber-risk-modelling-and-qualification.pdf, 16 pages.

*Primary Examiner* — Dereena T Cattungal

(57) ABSTRACT

A control flow graph representing a plurality of controls is constructed, wherein each control comprises a measure taken to counter threats to an IT infrastructure. For each path through the control flow graph, a metric quantifying an efficacy of the controls along the path in countering the threats is calculated. A threat strength distribution for threats to the IT infrastructure is constructed. A visualization of an efficacy of a combination of the plurality of controls is generated, based on the metrics, the control flow graph, and the threat strength distribution. A weakness in the plurality of controls is identified, based on the visualization. The plurality of controls is modified based on the identifying.

20 Claims, 20 Drawing Sheets

(51) Int. Cl.
   *G06Q 10/0637*   (2023.01)
   *G06Q 10/0635*   (2023.01)

(56) References Cited

U.S. PATENT DOCUMENTS

| | | | |
|---|---|---|---|
| 11,361,082 B2* | 6/2022 | Obee | G06Q 30/0185 |
| 2015/0381649 A1* | 12/2015 | Schultz | G06Q 10/0635 |
| | | | 726/25 |
| 2017/0093904 A1 | 3/2017 | Ng et al. | |
| 2018/0146004 A1* | 5/2018 | Belfiore, Jr. | G06F 21/577 |
| 2019/0052664 A1* | 2/2019 | Kibler | H04L 63/1433 |
| 2019/0205544 A1* | 7/2019 | Agarwal | G06F 16/904 |
| 2019/0364073 A1 | 11/2019 | Jones | |
| 2020/0014728 A1 | 1/2020 | Jones | |
| 2021/0105296 A1* | 4/2021 | Kibler | G06F 11/301 |
| 2021/0258334 A1* | 8/2021 | Sayag | H04L 63/1433 |
| 2021/0329025 A1* | 10/2021 | Ganor | G06Q 10/06315 |

* cited by examiner

CYBER RISK MINIMIZATION THROUGH QUANTITATIVE ANALYSIS OF AGGREGATE CONTROL EFFICACY

CROSS REFERENCE TO RELATED APPLICATIONS

This application claims the benefit of U.S. Provisional Patent Application Ser. No. 62/930,230, filed Nov. 4, 2019, which is herein incorporated by reference in its entirety.

FIELD OF THE DISCLOSURE

The present disclosure relates generally to cyber security, and relates more particularly to devices, non-transitory computer-readable media, and methods for minimizing cyber risk through quantitative analysis of aggregate control efficacy.

BACKGROUND OF THE DISCLOSURE

Ever since cyber security emerged as a paramount risk in the twenty first century, organizations both public and private have struggled to counter the threat. Risk managers have come to understand that cyber attacks cannot be entirely prevented, and therefore cyber risk cannot be completely eliminated.

Cyber risk can, however, be managed and mitigated through a variety of countermeasures known as controls. Controls include technical components and tools (e.g., firewalls, anti-malware agents, identity and access management, encryption, etc.), architectural aspects (e.g., cloud deployment or application platform characteristics), administrative processes and policies (e.g., secure employee onboarding/offboarding, configuration change management, incident response playbooks, periodic incident response exercises, etc.), and employee training (e.g., security awareness, anti-phishing testing, etc.). Most controls are attack-surface controls which directly counter vulnerabilities or attack vectors exploited by cyber adversaries.

SUMMARY

In one example, the present disclosure describes a device, computer-readable medium, and method for cyber risk minimization. For instance, in one example, a method includes constructing a control flow graph that represents a plurality of controls, wherein each control of the plurality of controls comprises a measure taken by an organization to counter threats to an information technology infrastructure of the organization, calculating, for each path of a plurality of paths through the control flow graph, a metric that quantifies an efficacy of a subset of the plurality of controls along the each path in countering the threats, wherein the calculating results in a plurality of metrics being calculated for the plurality of paths, constructing a threat strength distribution for threats to the information technology infrastructure comprising a statistical distribution of observed strengths of the threats, generating a statistical visualization of an efficacy of at least one combination of the plurality of controls, based on the plurality of metrics, the control flow graph, and the threat strength distribution, identifying, based on the statistical visualization, a weakness in the plurality of controls, and modifying the plurality of controls based on the identifying, in order to address the weakness.

In another example, a device includes a processing system including at least one processor and a computer-readable medium storing instructions which, when executed by the processing system, cause the processing system to perform operations. The operations include constructing a control flow graph that represents a plurality of controls, wherein each control of the plurality of controls comprises a measure taken by an organization to counter threats to an information technology infrastructure of the organization, calculating, for each path of a plurality of paths through the control flow graph, a metric that quantifies an efficacy of a subset of the plurality of controls along the each path in countering the threats, wherein the calculating results in a plurality of metrics being calculated for the plurality of paths, constructing a threat strength distribution for threats to the information technology infrastructure comprising a statistical distribution of observed strengths of the threats, generating a statistical visualization of an efficacy of at least one combination of the plurality of controls, based on the plurality of metrics, the control flow graph, and the threat strength distribution, identifying, based on the statistical visualization, a weakness in the plurality of controls, and modifying the plurality of controls based on the identifying, in order to address the weakness.

In another example, a non-transitory computer-readable medium stores instructions which, when executed by a processing system including at least one processor, cause the processing system to perform operations. The operations include constructing a control flow graph that represents a plurality of controls, wherein each control of the plurality of controls comprises a measure taken by an organization to counter threats to an information technology infrastructure of the organization, calculating, for each path of a plurality of paths through the control flow graph, a metric that quantifies an efficacy of a subset of the plurality of controls along the each path in countering the threats, wherein the calculating results in a plurality of metrics being calculated for the plurality of paths, constructing a threat strength distribution for a threats to the information technology infrastructure comprising a statistical distribution of observed strengths of the threats, generating a statistical visualization of an efficacy of at least one combination of the plurality of controls, based on the plurality of metrics, the control flow graph, and the threat strength distribution, identifying, based on the statistical visualization, a weakness in the plurality of controls, and modifying the plurality of controls based on the identifying, in order to address the weakness.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
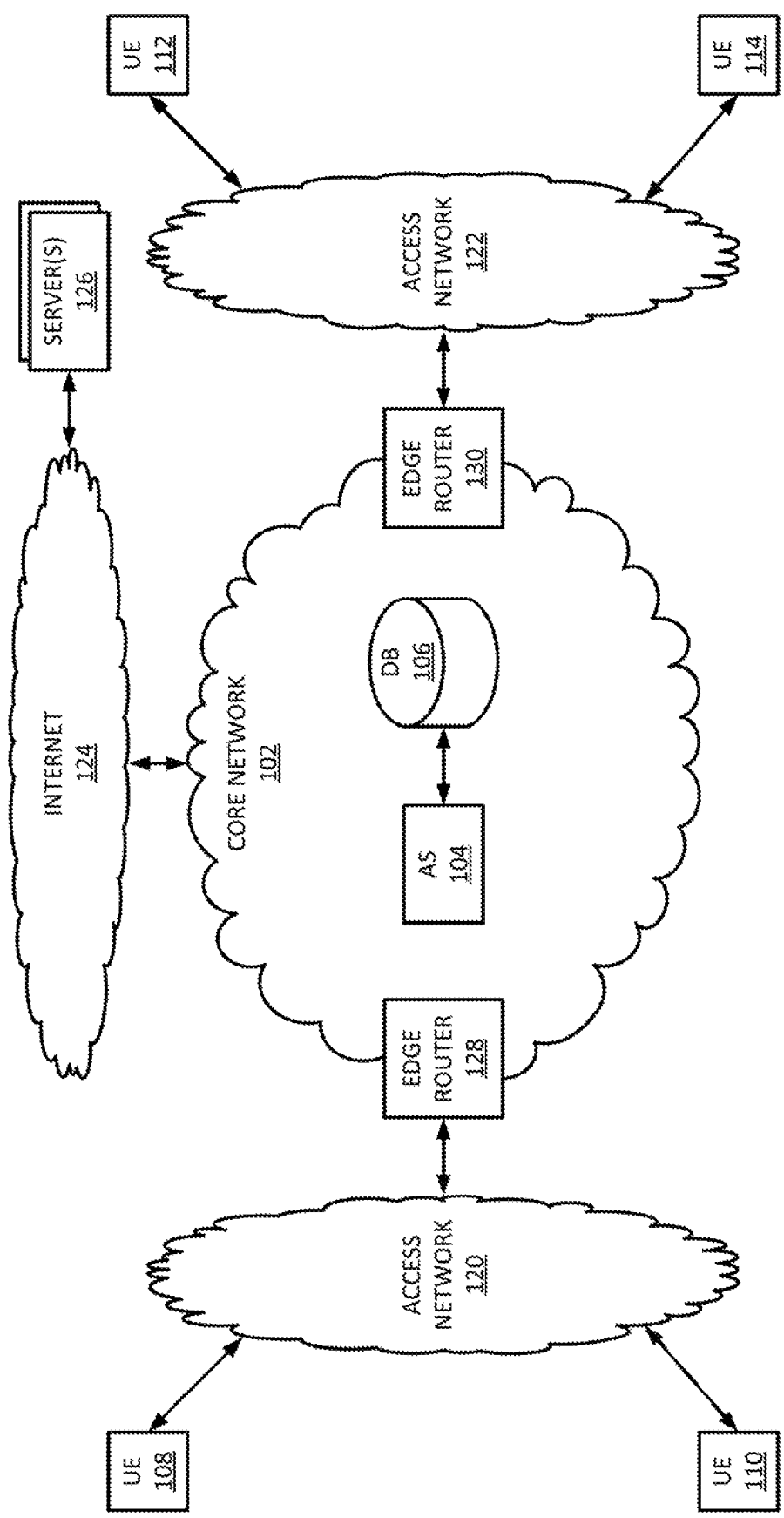
FIG. 1 illustrates an example system in which examples of the present disclosure for minimizing cyber risk may operate.

In one example, the present disclosure minimizes cyber risk through quantitative analysis of aggregate control efficacy. As discussed above, cyber risk can be managed and mitigated through a variety of countermeasures known as controls. The landscape of controls is typically vast, complex, and highly volatile due to evolving technology, as well as to shifts and ever-increasing sophistication in attacker techniques. Deliberate cyber attacks tend to involve a series of steps or actions, and accidental breaches most often result from a confluence of several factors. Each of these steps or factors represents an opportunity to prevent or detect the breach. Hence, at any given time, there will be a variety of competing approaches to security with diverse solutions promoted by control vendors in a huge and rapidly growing industry. Most vendor solutions are piecemeal rather than comprehensive; some solutions are complementary while other solutions are redundant. Because of the plethora of partial solutions of uncertain effectiveness, organizations tend to adopt a multiple-lines-of-defense (or "defense in depth") strategy which combines dozens or even hundreds of controls across their information technology (IT) infrastructure.

Due to the control complexity, churn, and lack of meaningful metrics, most organizations select and implement controls out of technical considerations that do not correlate with business risk, or simply by instinct. Some organizations are driven to overspend on security due to headline-generating (though very rare) mega-breaches combined with vendor fearmongering; other organizations underspend because the risk is invisible and security expenditures offer no tangible return on investment. Very few companies are able to map out and size their actual cyber risk in terms of expected impact to their assets and business operations, then chart a strategy to reduce that risk to acceptable levels with a comprehensive set of controls that is measurable in both aggregate efficacy and cost effectiveness.

For lack of a reliable regime for risk management, industries and governments have resorted to a compliance-based security strategy. Regulatory frameworks and industry standards attempt to codify either industry "best practices" or, in some cases, a comprehensive list of potentially applicable controls. The resulting checklist approach is in no way informed by the organization's actual risk profile, nor can the approach account for the effectiveness of controls relative to that risk. It is an oft-proved maxim in the industry that compliance does not provide security. Even when a compliance exercise mandates a risk assessment, the traditional qualitative (e.g., red/yellow/green) methods fail to capture business risk and often lead to less effective decisions than would result from uninformed instinct alone.

Against this background, the mid to late 2010s saw the emergence of two schools of cybersecurity governance that offer potential for improved risk management: cyber risk quantification (CRQ) and breach and attack simulation (BAS).

CRQ attempts to analyze and forecast cyber risk and its underlying components using measurements and established statistical techniques, allowing rigorous risk management in business or other mission-relevant terms (e.g., dollars). One initiative, Factor Analysis of Information Risk (FAIR™), has achieved significant industry interest due to its simplicity and transparence. FAIR is based on an ontology that helps an organization scope and decompose its risk into factors and sub-factors. This decomposition is useful both in understanding root causes and in measurement of risk in terms of expected frequency and severity of events that cause business losses. However, neither FAIR nor other CRQ methodologies extend to the level of specific cyber controls.

BAS represents a next generation of penetration (pen) testing and "red team" capabilities, addressing the limitations of traditional vulnerability scans and pen testing. BAS tools systematically and automatically test an organization's defenses by simulating attacks. In risk management parlance, BAS is an example of a "variance control," i.e., a newer type of control that serves to test and verify the correct configuration and functioning of attack-surface controls over time. BAS tools are expected to play a major role in the security governance arsenal. However BAS tools have no cognizance of risk. For effective security, the value of a control depends not just on its correct functioning but also on its relevance to business assets and potential loss events of concern as well as its relationship to other relevant controls.

Examples of the present disclosure fill the gap between CRQ and BAS techniques and enable an integrated cyber management regime in which security investment decisions are made both in context of overall business risks and goals and with an assurance of efficacy that can be measured and audited. More particularly, examples of the present disclosure represent an important convergence between these two new and important, but disconnected, initiatives in security governance that have started to gain traction: first, analysis and measurement of cyber risk in business terms (e.g., dollars), and second, testing and verification of effectiveness of security controls through systematic attack simulation.

As discussed above, an organization's susceptibility to cyber incidents (e.g., external attacks, malicious insider attacks, accidents, etc.) is determined by the aggregate strength of its controls. Controls act within a landscape of threats, vulnerabilities, assets, and business processes to limit and reduce the level of cyber risk (i.e., the likelihood that the organization will be victim to a cyber incident and/or the severity of such an incident). Controls are typically instituted and maintained by IT security personnel along with human resources (HR), operational technology management, and other organizational functions. Controls may be enhanced as necessary to reduce the organization's risk. Examples of the present disclosure provide a measurably effective mechanism for enhancing controls that accommodates the complexity of modern IT security infrastructure.

In one example, effective risk management begins with identification and prioritization of an organization's top risks from a business or mission perspective. Risks in the information security domain can be easily identified using a simple taxonomy of common adverse events. As an example, loss events may be categorized by the type of business impact (e.g., breach of confidential data, business interruption, ransomware, misdirection of funds, etc.) and the threat category (e.g., external attacker motivated by direct financial gain or by competitive advantage, disgruntled insider, accidental disclosure, etc.). Given the type of business impact and the threat category, a set of high-level threat scenarios can be identified. Common scenarios for the external-attacker category can be categorized by initial entry or by attack type (e.g., phishing or other email-based social engineering attacks, attacks using stolen or forged credentials, web application attacks, exploits of unpatched vulnerabilities, etc.). Each scenario may consist of one or more sequences of actions taken by an attacker or threat agent to accomplish an outcome resulting in a loss event. Each of the actions may potentially be avoided, detected, and/or blocked by one or more of the controls maintained by the organization.

Because controls represent, by definition, all elements over which an organization has control, effective security risk management relies on information about the dynamic behavior of an organization's control configuration relative to specific threat scenarios. In one example of the present disclosure, the information about the dynamic behavior is developed and presented, or visualized, in three forms: (1) path analysis (which explores the role of different attack paths in the organization's risk exposure and highlights critical paths and weaknesses); (2) sensitivity analysis (which shows relative importance of individual controls, points of strength and weakness, and opportunities for strengthening defenses); and (3) "what-if" scenario modeling (for comparison of alternative proposed control enhancement portfolios or of different states over time). In one example, the mechanism for security enhancement comprises a process for implementing control improvements based on the information about the dynamic behavior, along with cost considerations.

In one example, control behavior information may be calculated via Monte Carlo simulation modeling. Examples of the present disclosure create an abstracted model of the organization's security control configuration and run a large number of simulated random attacks against the model to produce a probabilistic behavioral forecast of both individual and aggregate functioning and effectiveness of the controls. The forecast may be displayed using the path analysis, sensitivity analysis, and what-if visualization techniques described above.

It should be noted that although examples of the present disclosure are discussed within the example context of cyber security, the examples may be more broadly applicable to assessing other types of hazard risk. For instance, the techniques disclosed herein may be relevant to any risk in which a multiplicity of types of threats is countered with a multiplicity of controls using a "defense in depth" approach. One particular example of another field in which the methods disclosed herein may be applied is the physical security of an industrial facility in which multiple threats (e.g., forced entry, theft, sabotage, etc.) are countered with a variety of controls (e.g., locks, alarm systems, security guards, etc.). Another example of another field in which the methods disclosed herein may be applied is the prevention of traffic accidents, which often occur due to simultaneous failure of multiple controls including instances of signs, speed limits, barriers, lane change signals, blood alcohol levels, and the like.

To further aid in understanding the present disclosure, FIG. 1 illustrates an example system 100 in which examples of the present disclosure for minimizing cyber risk may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a telecommunication service to subscribers via access networks 120 and 122. In one example, the access networks 120 and 122 may comprise different types of access networks, may comprise the same type of access network, or some access networks may be the same type of access network and others may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for minimizing cyber risk, as described herein. For instance, the AS 104 may be configured to operate as a Web portal or interface via which a user endpoint device, such as any of the UEs 108, 110, 112, and/or 114, may access an application that assesses, designs, and implements enhancements to strengthen an organization's cyber posture and reduce the organization's level of cyber risk.

Figure 13:
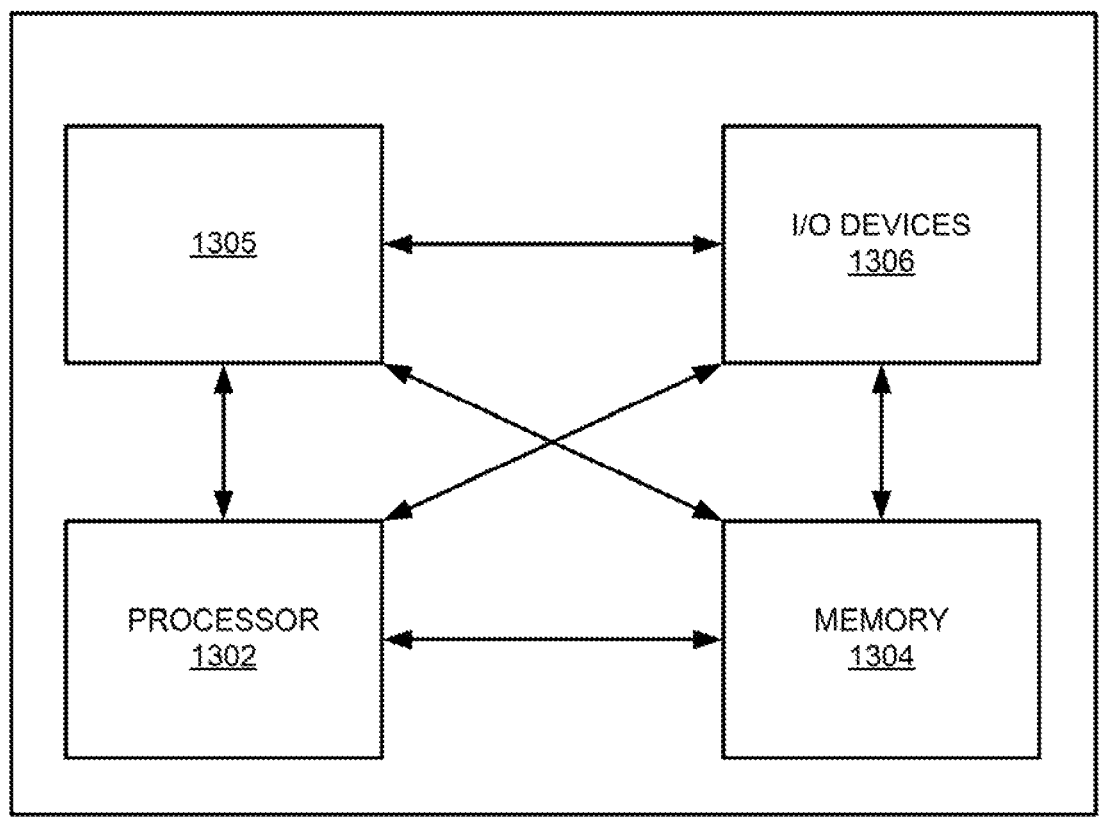
FIG. 13 depicts a high-level block diagram of a computing device specifically programmed to perform the functions described herein.

To this end, the AS 104 may comprise one or more physical devices, e.g., one or more computing systems or servers, such as computing system 1300 depicted in FIG. 13, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 13 and discussed below) or multiple computing devices collectively configured to perform various steps, functions, and/or operations in accordance with the present disclosure.

For instance, in one example, the AS 104 may perform a series of operations related to assessing, designing, and implementing enhancements to strengthen an organization's cyber posture and reduce the organization's level of cyber risk. In one example, the operations include one or more of the following steps: (1) identification and prioritization of top information technology related risks from a business perspective (including consideration of stress factors and of current or upcoming changes in the organization's attack surface or threat landscape; high-level threat scenarios linked to these top risks are identified); (2) selection or creation of a cyber flow graph corresponding to the top risks and scenarios of concern to the organization (including encoding or adapting of the flow graph and setting of input parameters for a simulation model); (3) use of critical path weakness and other flow-graph based visualizations for an initial identification and prioritization of high-risk threat or control domains that warrant further attention; (4) use of sensitivity analysis and tornado charts to identify specific control deficiencies that represent opportunities for productive risk reduction investment; (5) translation of individual control deficiencies into a set of competing, comprehensive proposals for security enhancement (this may involve: a) examination of specific input parameters related to deficient controls; and b) analysis of potential synergies or redundancies that arise in combining control improvements); an arbitrary number of alternate proposals, or improvement portfolios, may be drafted; (6) measurement of the relative effectiveness of the alternate proposals, using "what-if" scenario comparisons in the simulation model; (7) analysis of relative cost-effectiveness and economic or organizational feasibility of alternate proposals, using cost modeling; (8) selection and implementation of a security enhancement portfolio, based on the cost-return-optimal proposals identified in step 6) (implementation may involve installation or upgrade of technical controls, or development or strengthening of administrative processes and policies, along with policy audits and enforcement, or both); and (9) regular review of cyber posture (starting with step (1) above, with particular focus on any changes that may have occurred since the last review in control operations or control effectiveness, attack surface, threat landscape, or other organizational factors that could affect cyber risk). These operations are discussed in further detail below in connection with FIGS. 2-10E.

The AS 104 may have access to at least one database (DB) 106, where the DB 106 may store information related to the controls currently implemented by an organization, vendors (if any) associated with the controls, past simulations and analyses of the controls, various proposals related to enhancements of the controls, previous successfully and/or attempted attacks, and/or other information.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
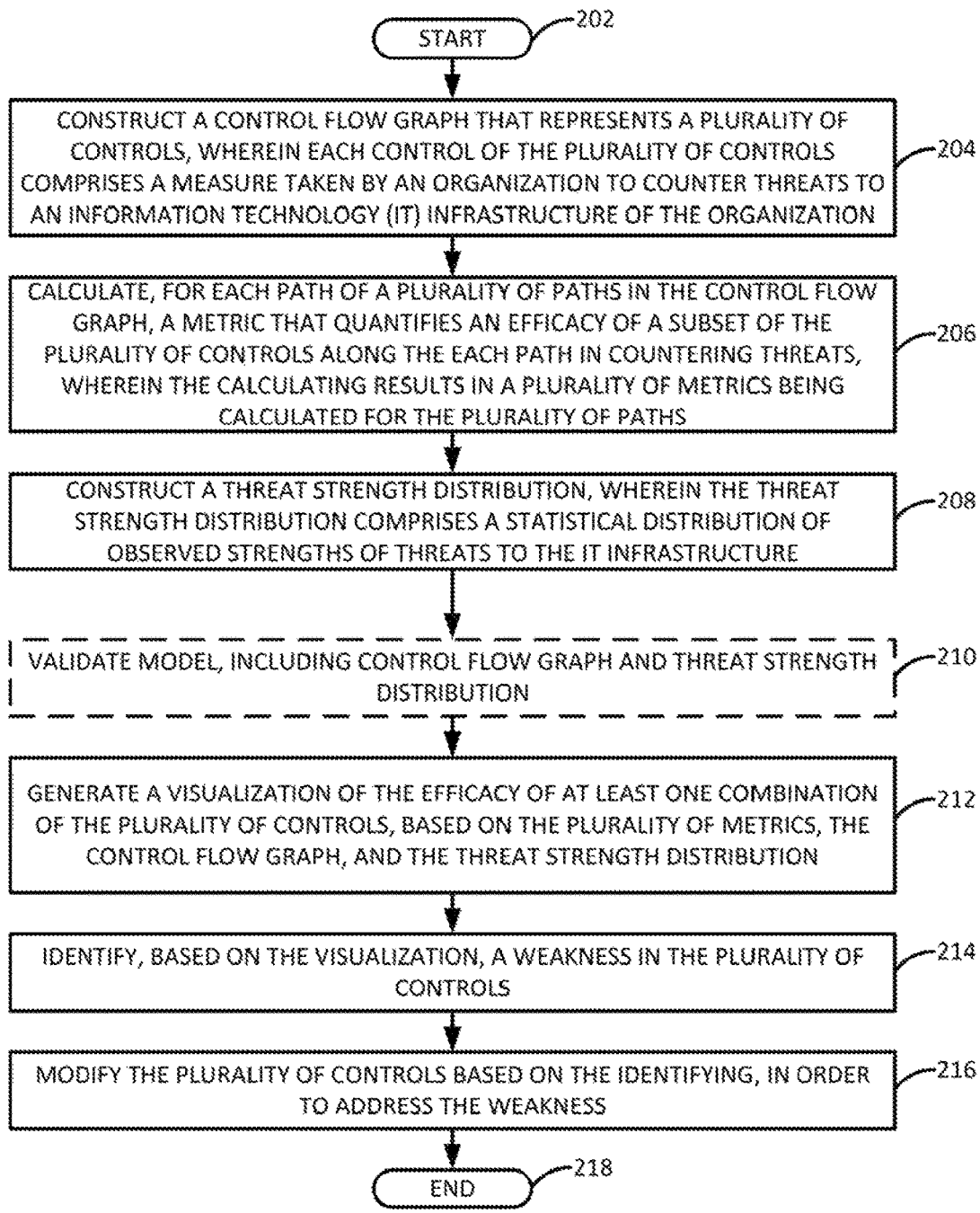
FIG. 2 illustrates a flowchart of a first example method for minimizing cyber risk.

FIG. 2 illustrates a flowchart of a first example method 200 for minimizing cyber risk. In one example, the method 200 may be performed by an application server, e.g., AS 104 of FIG. 1, alone or in combination with other devices. In another example, the method 200 may be performed by a computing device or a processor of a computing device, such as the computing device 1300 discussed below in conjunction with FIG. 13. For the sake of example, the method 200 is described as being performed by a processing system.

The method 200 begins in step 202. In step 204, the processing system may construct a flow graph that represents a plurality of controls, where each control of the plurality of controls comprises a measure taken by an organization to counter threats to an information technology (IT) infrastructure of the organization.

The structure of a risk-aware model of control efficacy is dictated by the nature of threat events as sequences of actions. For instance, in the example of an external data breach attack, the following series of actions may occur: (1) the perpetrator may gain entry into the enterprise IT infrastructure; (2) the perpetrator may protect itself against detection; (3) the perpetrator may obtain some means of accessing the desired data; (4) the perpetrator may find and collect the data; and (4) the perpetrator may finally exfiltrate the collected data to an external server. As mentioned above, each action may be blocked by controls. Malicious insider breaches, accidental breaches, and other types of cyber loss events can similarly be modeled as sequences of controllable actions. Accidents, for example, typically occur because of a series of control failings (e.g., employee training, process enforcement, anomalous activity detection, and/or exfiltration prevention). Because each action may be accomplished or may occur through a variety of specific tactics or techniques, there is a large intertwined space of potential action sequences for each threat category.

Figure 3:
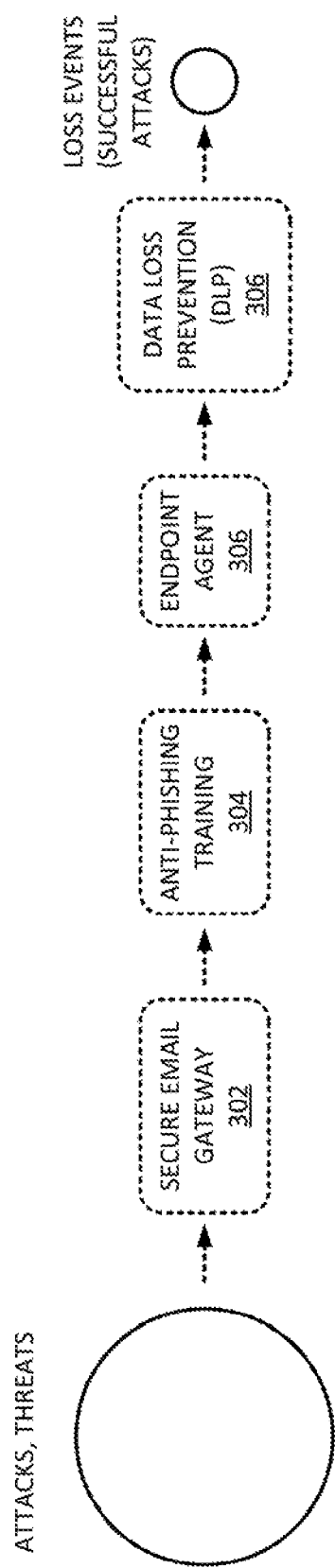
FIG. 3 illustrates an example of a simple flow graph showing the selection of typical cyber controls.

Thus, examples of the disclosure model the controls as a flow graph (also referred to herein as a "control flow graph"), or alternatively as a directed acyclic graph (DAG). In one example, the flow graph comprises a plurality of nodes connected by a plurality of directed edges, where each node of the plurality of nodes may represent a control of the plurality of controls, each edge may represent a relationship between a pair of controls whose nodes are connected by the edge (e.g., the relationship may be that both controls are applied to a potential threat in sequence), and each edge may be further associated with a direction (e.g., as indicated by an arrowhead) that indicates the order in which the pair of controls is applied (e.g., where the edge points to the node of the later-applied control). Thus, a flow graph according to the present disclosure may comprise at least: a start node, an end node, and a plurality of paths connecting the start node to the end node, where each path is made up of a plurality of edges and traverses one or more intermediate nodes. The start node in this case may represent the universe of cyber threats encountered by the organization's IT infrastructure. Each intermediate node may represent a simple prevention or blocking control that may or may not succeed at detecting and blocking any given threat. Each threat follows a specific path through the flow graph according to the threat type and the particular tactics and techniques employed to block the threat. If not blocked by a control along the path, the threat will arrive at the end node, which may represent the set of successful cyber attacks or events that cause harm to the organization. FIG. 3 illustrates an example of a simple flow graph 300 showing the selection of typical cyber controls including a secure email gateway 302, anti-phishing training 304, an endpoint agent 306, and data loss prevention (DLP) 308.

In one example, a plurality of flow graphs may be constructed in step 204, where each individual flow graph may be built for a specific loss event and threat category. Each flow graph may be developed in a series of steps, beginning with an attack chain graph representing potential sequences of actions taken by an attacker or a threat in order to achieve a successful result. For external attack threats, the attack chain graph may be based on a known industry framework, such as the MITRE ATT&CK™ framework, a catalog of tactics and techniques that have been used in malware-related cyber attacks.

Figure 4:
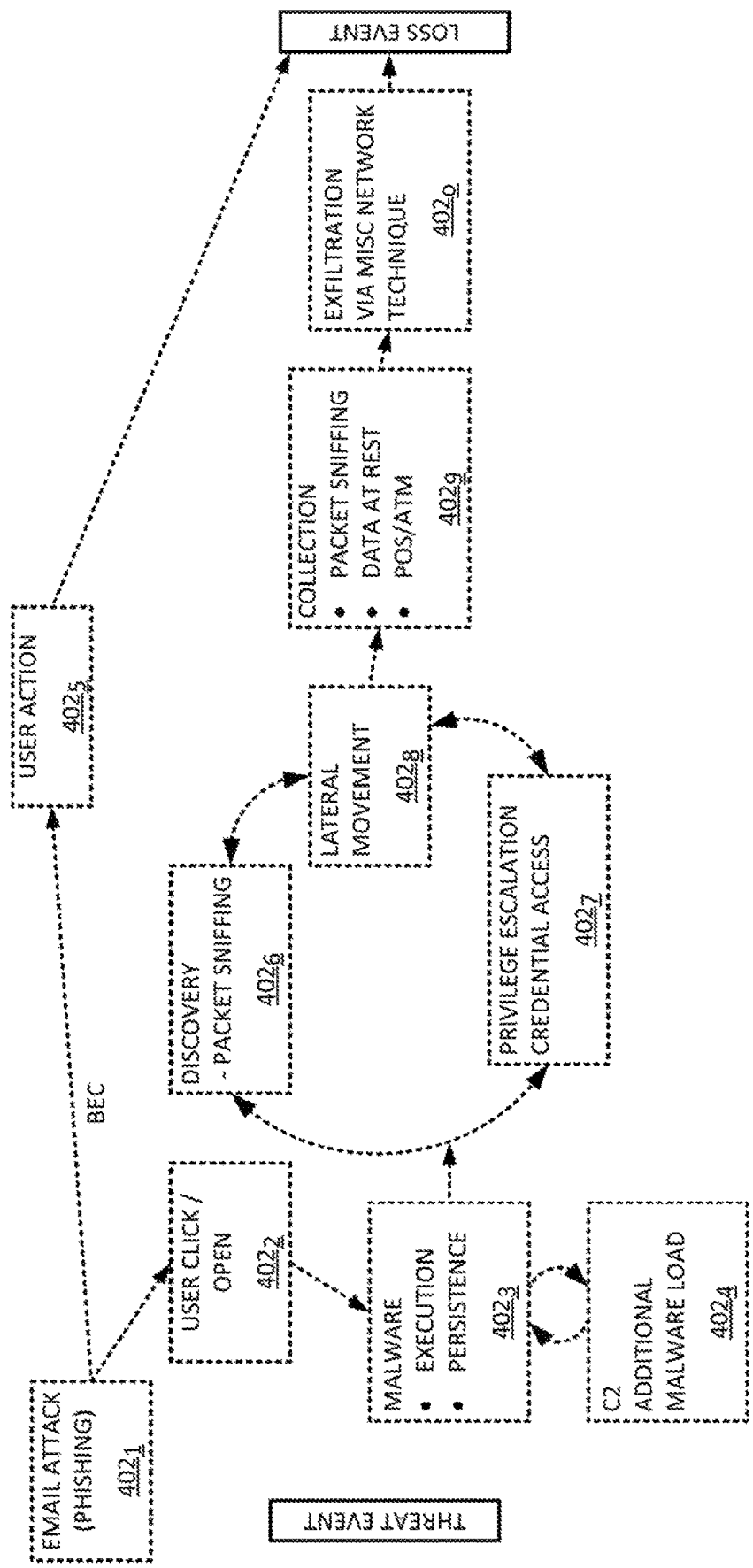
FIG. 4 illustrates a portion of an example attack chain graph in which the data breach attempt is a phishing attempt.

In one example, an attack chain graph is first built relative to the specific risk type(s). The attack chain graph may be a type of graph other than a directed acyclic graph (DAG), as the attack chain graph may contain cycles. The cycles may represent, for example, the cyclical behavior of an attacker in repeated attempts to achieve certain intermediate results (e.g., a privilege upgrade needed to access confidential data). FIG. 4 illustrates a portion of an example attack chain graph 400 in which the data breach attempt is a phishing attempt. In the example attack chain graph 400, each node $402_1$-$402_o$ (hereinafter individually referred to as a "node 402" or collectively referred to as "nodes 402") may represent one attack action that may be part of the phishing attempt (e.g., a user clicking or opening an email, execution of malware, etc.).

Figure 5:
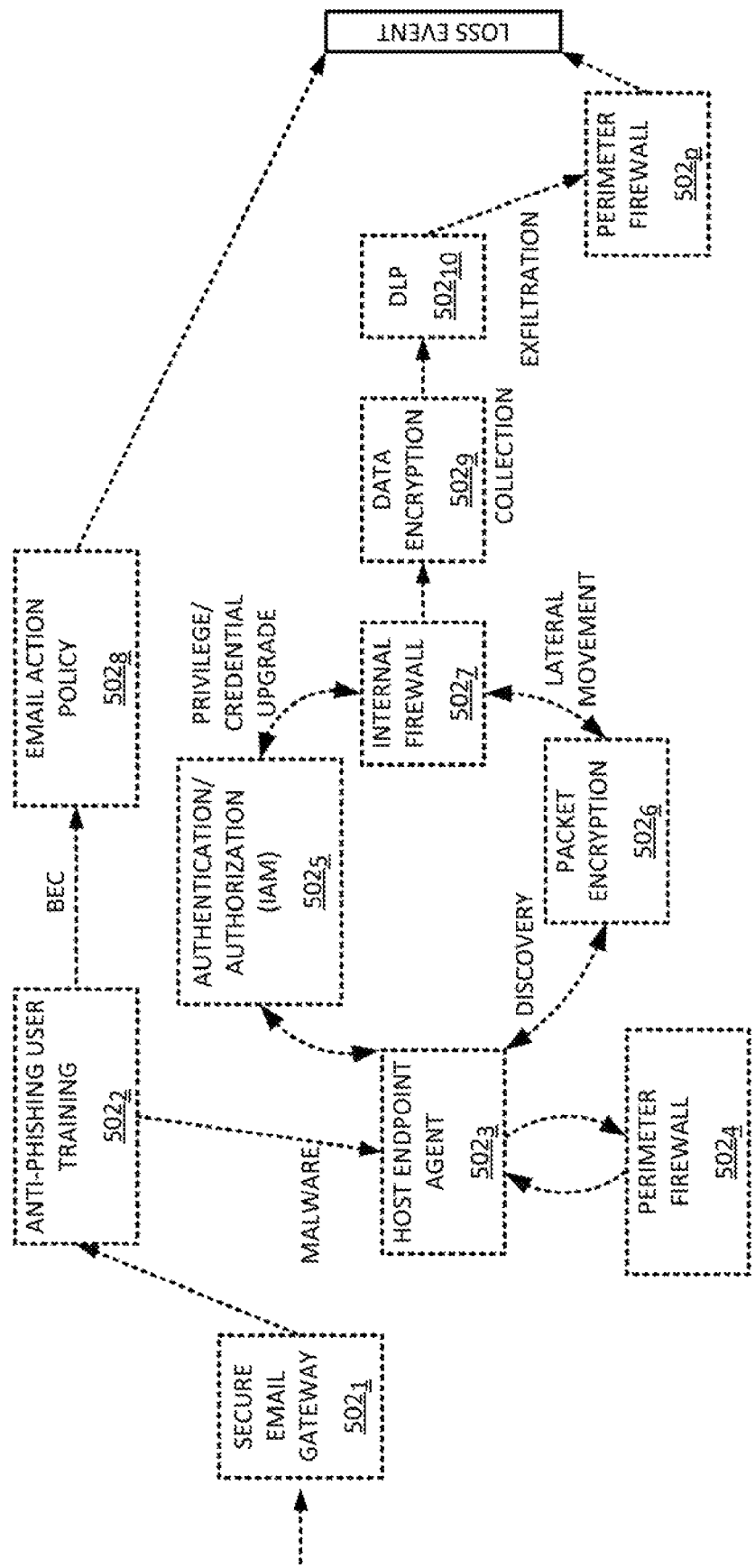
FIG. 5 illustrates a portion of an example control chain graph that has been constructed from the example attack chain graph of FIG. 4.

In one example, the attack chain graph is translated into a control chain graph by replacing each attack action with a control or sequence of controls that might be used to prevent the action. The structure of the control chain graph may not be identical to that of the attack chain graph, as several controls may be employed to prevent a single attack action, or several types of attack actions may be countered by the same single control. FIG. 5 illustrates a portion of an example control chain graph 500 that has been constructed from the example attack chain graph 400 of FIG. 4. In the example control chain graph 500, each node $502_1$-$502_p$ (hereinafter individually referred to as a "node 502" or collectively referred to as "nodes 502") may represent at least one control that may be employed to prevent a specific attack action of the phishing attempt (e.g., user training to recognize phishing attempts, firewalls, etc.).

Figure 6:
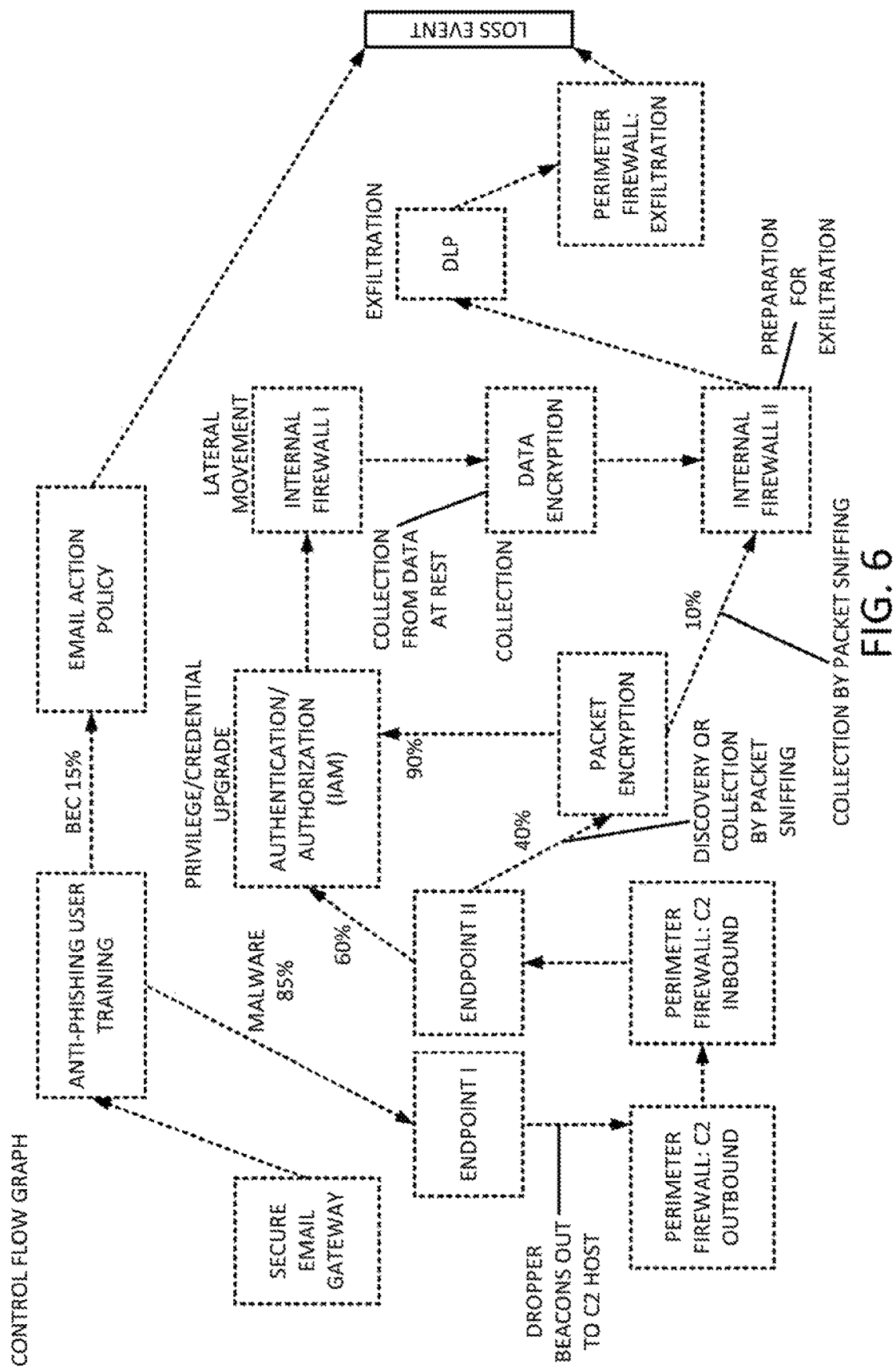
FIG. 6 illustrates an example control flow graph that may be generated from the example control chain graph of FIG. 5.

In one example, the control chain graph is converted into a control flow graph. The control flow graph is an abstraction of the control chain graph; for instance, attack action sequences may be summarized rather than represented in full in case of repeated actions. The control flow graph represents the accumulation of control strength over the successive controls on the paths from start node to end node. FIG. 6 illustrates an example control flow graph 600 that may be generated from the example control chain graph 500 of FIG. 5. In one example, converting the control chain graph to a control flow graph comprises a two-step process.

Figure 7:
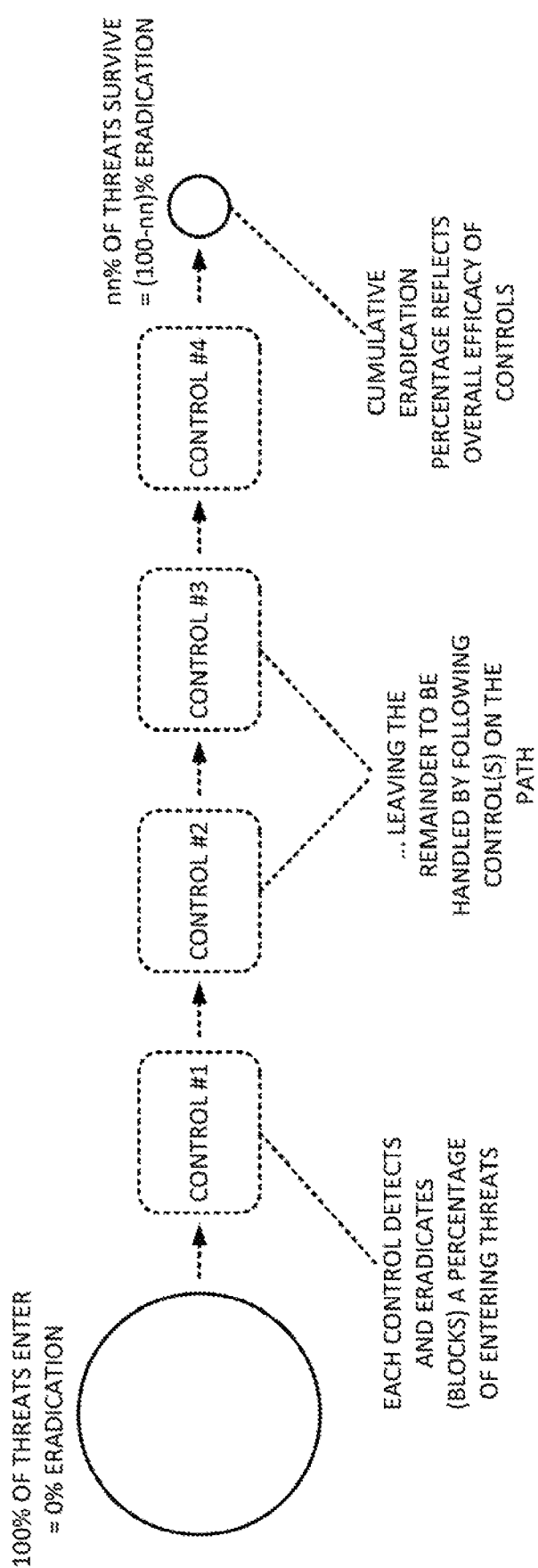
FIG. 7 illustrates an example quantifying control strength over a single path of a control flow graph.

The first step is to eliminate cycles. While there are no cyclical action sequences in a flow graph, nodes may recur nonetheless. An example is the repeated role of the workstation (e.g., endpoint) agent in the malware load from a command and control (or "C2") server. FIG. 7, for instance, illustrates an example 700 quantifying control strength over a single path of a control flow graph in which an endpoint agent has a repeated role. In such cases, the node representing the corresponding control may be split into two or more nodes (e.g., "Endpoint I" and "Endpoint II" in FIG. 6) representing different instances of the same control.

The second step is to establish branch percentages. In one example, any node in the flow graph may have multiple successors representing multiple outbound edges or paths.

For simulation purposes, a node with multiple successors may be annotated with the relative frequencies of these multiple paths for the threat type being modeled, as shown in FIG. 6.

Figure 8A:
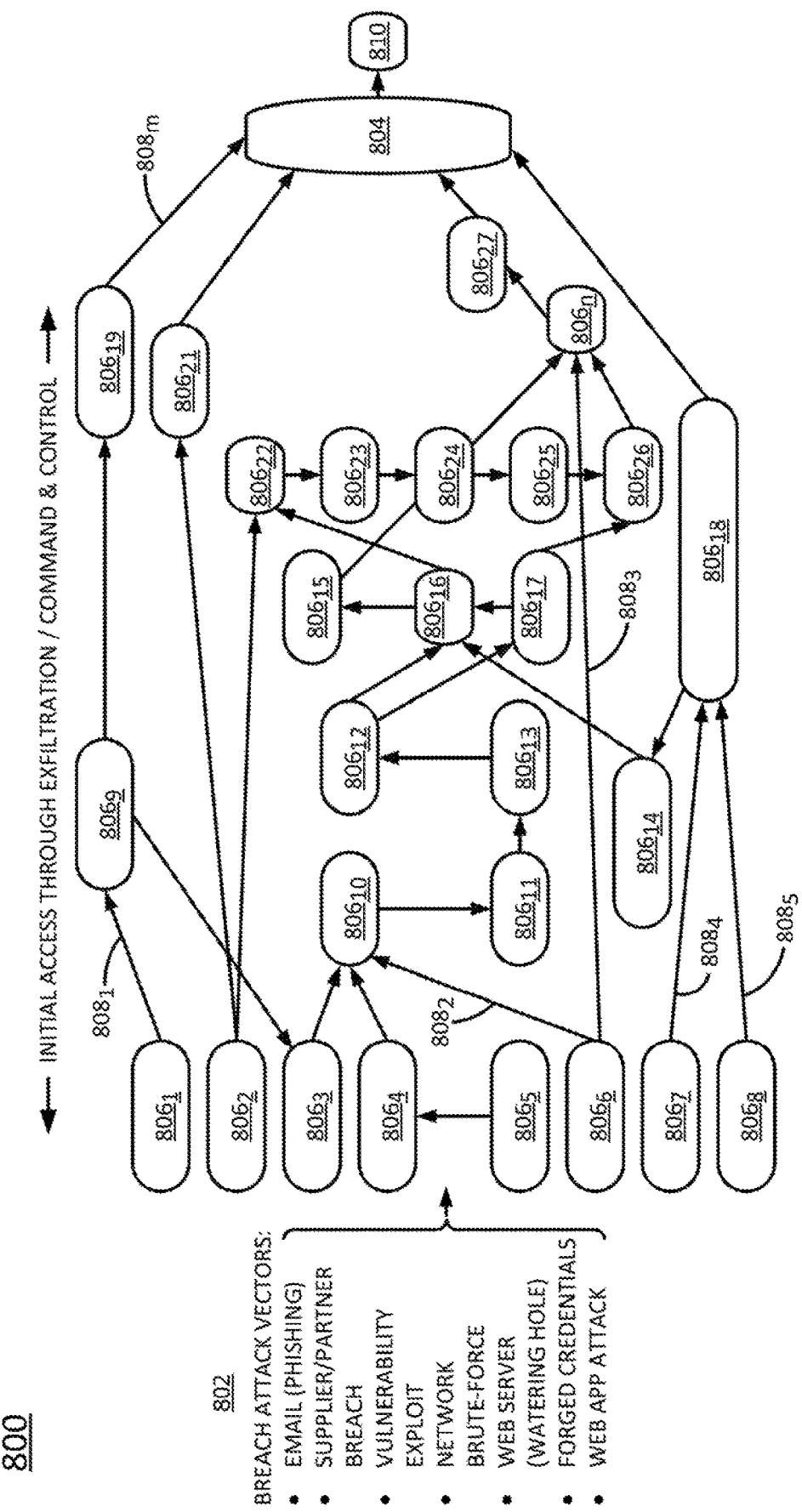
FIG. 8A illustrates a more generalized example of a control flow graph.

FIG. 8A illustrates a more generalized example of a control flow graph 800. As discussed above, the control flow graph 800 includes a plurality of nodes, specifically: a start node 802, an end node 804, and a plurality of intermediary nodes $806_1$-$806_n$ (hereinafter individually referred to as an "intermediary node 806" or collectively as "intermediary nodes 806," only some of which are labeled in FIG. 8A for the sake of simplicity). The start node 802 represents the breach attack vectors, i.e., the universe of cyber threats encountered by an IT infrastructure (e.g., email/phishing, supplier/partner breach, vulnerability exploit, network brute-force, web server/watering hole, forged credentials, web application attach, and the like). The intermediary nodes represent the controls of the IT infrastructure (e.g., packet encryption, authentication/authorization, internal firewall, and the like). The end node 804 represents the set of successful cyber attacks, or remaining threats (which the controls have failed to eradicate) that are queued for a security operations center (SOC), a simulated version of which is illustrated at the node 810.

The control flow graph further comprises a plurality of edges $808_1$-$808_m$ (hereinafter individually referred to as an "edge 708" or collectively as "edges 808," only some of which are labeled in FIG. 8A for the sake of simplicity) connecting the plurality of nodes 806. As discussed above, some of the edges 808 may be annotated with percentages to show the relative frequencies of multiple possible successors or subsequent nodes 806.

Figure 8B:
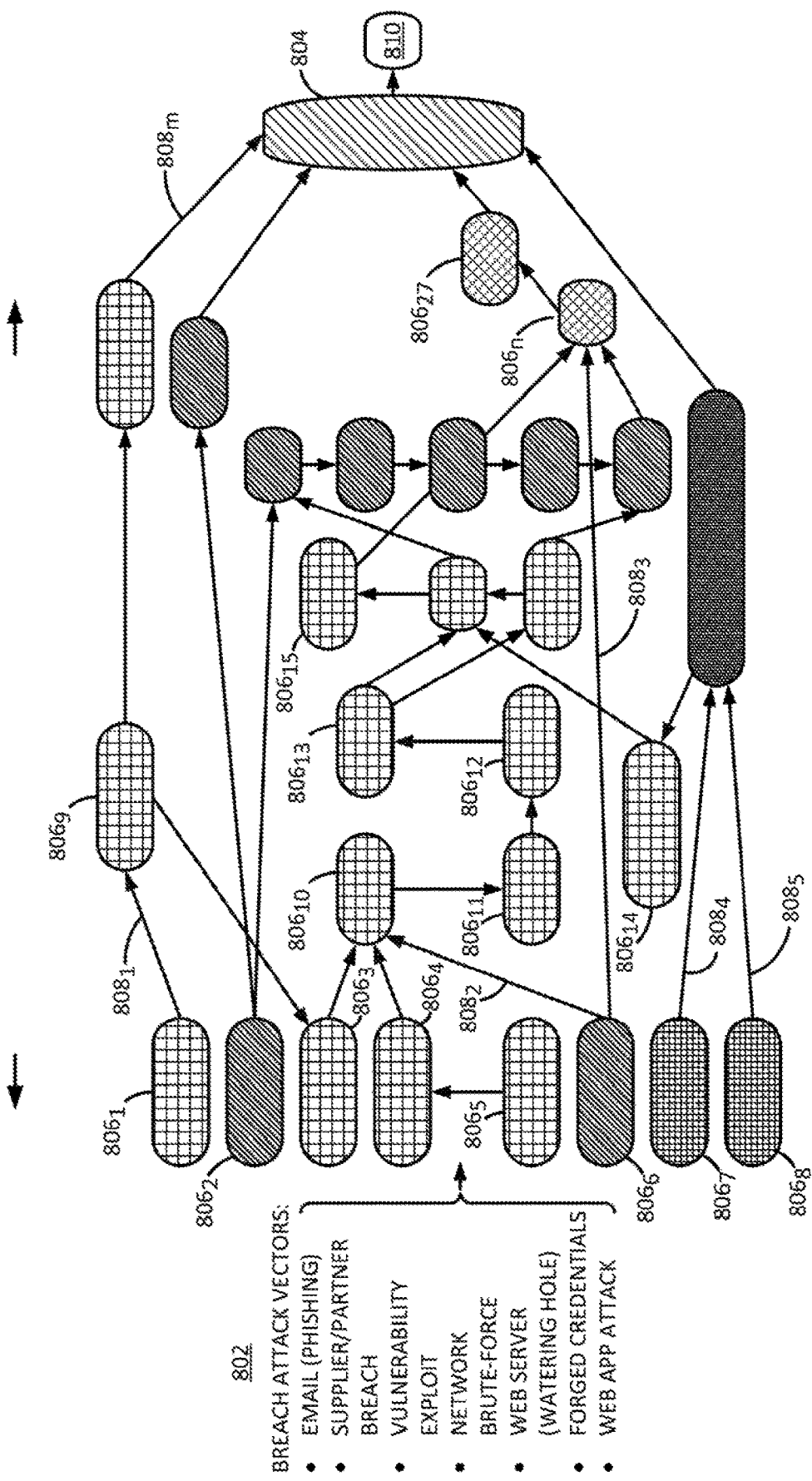
FIG. 8B shows the example control flow graph of FIG. 8A, but with cross hatching to show varying degrees of path weakness.

FIG. 8B shows the example control flow graph 800 of FIG. 8A, but with cross hatching to show varying degrees of path weakness. In one example, the darker or more saturated the color or cross hatching of an intermediary node 806 is, the more critical (or more weak) the path including that intermediary node 806 is.

The control flow graph may be constructed under the direction of a user using a graph builder user interface. The graph builder user interface may provide built-in templates for common risk types, so that the user may only need to provide numerical parameters, branching percentages, and threat counts (e.g., approximate ranges of the expected total count of threats entering the organization on a periodic (e.g., daily, weekly, etc.) basis) where necessary.

As described above, controls in the control flow graph may comprise simple blocking controls. When faced with an entering threat, a simple blocking control either succeeds or fails to detect and eradicate the threat, with no other outcome possible. This binary approach can limit the effectiveness of a control, because the blocking action can be taken only when sufficient information is available to ensure that the suspicious behavior detected is a genuine threat and not legitimate activity that must not be disrupted. However, this binary approach simplifies the simulation, because the impact of the control can be modeled with a simple detection/eradication percentage.

In other examples, at least some of the controls may be detection-response (D-R) controls. In contrast to simple blocking controls, D-R controls are capable of raising an alert to notify other software components or human security analysts of suspicious activity that may or may not constitute a threat. An alert, in this context, refers to a real-time message, or alert transit object, directed to an organization's SOC, with a variety of information about the detected activity and the detected activity's context. The alert may contain information about other, potentially related, events, or the originating control might make such data available to the SOC on request. This additional information can be useful to the SOC in prioritizing and responding to the alert.

In one example, the flow of alerts from D-R controls is modeled as a statistical range. Hence, alert messages in the model describe a volume of alerts rather than individual alerts, and the various alert attributes in the message are passed as ranges or distributions over the subject alerts. As used herein, the term "alert" refers to a stochastic representation of the flow of alerts.

In one example, the role of the SOC in the model is to augment the eradication efficacy of controls in the control flow graph that are designated as D-R controls. In effect, each such control enlists the SOC to assist in resolving complex or ambiguous situations that cannot be immediately resolved by terminating the suspicious activity. To the extent that the simulated SOC is successful at intercepting and eradicating the suspicious activity, the effective eradication credited to the originating control may be increased.

Alerts may be more or less actionable, and, hence, useful, in countering cyber incidents. Low actionability occurs when a control detects an event that is suspicious, but, due to limited contextual data available, the event's malicious or damaging potential cannot be ascertained or verified. An alert triggered by an activity that is not actually a threat may be referred to as a false positive. There is a tradeoff between detection effectiveness and false positives. A blocking-only control's threat detection is always actionable (indeed no further action is needed except for cleanup), but limited in effectiveness as the blocking-only control will miss genuine threats due to potential ambiguity. At the other extreme, a D-R control with an aggressive alerting policy may miss almost nothing, but may generate a large number of false positives. The false positives can significantly inhibit effective response by the SOC if neither software nor human analysts are able to easily distinguish, and channel resources to, the actual threats.

In one example, the SOC is modeled, in the control flow graph, as a set of software components and human security analysts. The software components receive alerts from controls and attempt to correlate alerts among themselves and with other event data to reduce false positives and increase actionability of alerts. SOC software components may maintain a prioritized queue of cases for the human analysts, derived from incoming alerts, and may perform other prioritization and preparation functions to increase the human analysts' effectiveness and efficiency. The human analysts constitute a limited resource that processes and attempts to resolve potential threat issues. False positives and weak alerts will diminish the human analysts' effectiveness. Successful resolution of alerts increases the effective aggregate control strength of the overall simulated configuration and adds to the effective threat eradication of controls that generate actionable alerts.

The effectiveness of D-R controls and the SOC may be derived via Monte Carlo simulation based on a set of additional model inputs or control parameters. Several inputs specify the alert behavior of each control. In one example, an allow-alert percentage control parameter is a measure of a control's use of alerts in lieu of blocking on detection of threats. Allow-alert will be zero for a blocking-only control, non-zero for a D-R control, and one hundred percent for a D-R control with a policy setting to always alert rather than block. Another per-control parameter, referred to herein as confidence strength, indicates the expected actionability and strength of generated alerts and avoidance of false positives. Confidence strength reflects both access to potentially related event data over an extended timeframe, and algorithmic strength adequate to perform sophisticated correlations. Alerts from high-confidence controls can be given priority in the SOC as they are likely to be actionable and resolvable, whereas alerts from lower confidence controls may be difficult to distinguish from false positives. Other control parameters include indications of the control's stage relative to the overall flow network and the relative criticality of assets or business processes within the control's range of detected activity. These last two control parameters (i.e., confidence strength and stage) may be used to establish priority of cases within the SOC.

The modeled SOC may have its own input parameters. One input parameter of the SOC may be referred to as analytic strength, i.e., a characteristic of SOC software tools including security information and event management (SIEM) and security orchestration, automation, and response (SOAR) products. SOC analytic strength reflects the software tools' abilities to correlate alerts and events to reduce false positives and increase strength and actionability of cases queued for analysts. Correlation is performed: (1) among alerts and other event data from a specific control, in effect compensating for weakness (low confidence strength) in controls; and (2) among alerts and event data from different controls. The latter is important, because individual threat activities typically traverse multiple controls and may trigger multiple alerts that can be combined for more effective response.

In one example, the capacity of the human analyst resource pool is a model input, specified in terms of the quantity of cases the human analysts are typically able to process and resolve during the standard time period (e.g., one day). For definiteness, human analyst capacity may be estimated under the assumption that all cases are high confidence.

Because human analyst resources are typically insufficient to investigate and resolve all cases in the SOC, the case queue must be prioritized. In one example, the model allows simulation of various prioritization strategies that may be employed in real-world SOCs. Each such algorithm takes as input a set of priority factors which are attributes of cases on the queue. Factors may include the confidence level of the originating control, perhaps enhanced by SOC software in accordance with the analytic strength of the SOC; the stage of the control; and the asset or business process value. Relative weighting of these factors in the prioritization algorithm may be configured by the user via model inputs.

In addition to each case's calculated priority, each case in the queue also has a processing cost which indicates the amount of human analyst resources required to resolve the case. Cost is a function of the alert volume combined with a simulated measure of false positives. False positives are calculated from the alert confidence strength; very high confidence controls are assumed to generate very few false positives, whereas low confidence controls may generate very large numbers of false positives. The volume of false positives is an exponential function of the confidence weakness (e.g., arithmetic inverse of confidence strength) with the coefficient of the exponent configurable as an SOC-level model input. Both priority and cost are distributions reflecting the range of attribute values underlying individual alerts and cases.

In one example, the model may run the case queue under Monte Carlo simulation, sampling randomly from the priority and cost distributions. In each simulation run, sample cases may be taken in priority order and processed until the cumulative processing cost exceeds the SOC human analyst capacity. Cases not processed represent lower priority alerts that are ignored by an under-staffed SOC (which often results from a large volume of false positives from weak confidence strength controls).

Examples of the present disclosure take measures to realistically simulate alerts and SOC threat resolution relating to redundant alerts along paths in the control flow graph. A single threat event may trigger multiple allow-alerts as the threat event traverses a path containing a sequence of controls. Furthermore, the threat event may be eradicated by a blocking control later in the path, rendering moot the alerts previously sent. As discussed, sophisticated SOC software (e.g., with high analytics strength) should be able to correlate and eliminate these redundant or nullified alerts to create stronger, more actionable combined cases for SOC analyst processing; in the absence of such correlation capability, the extra alerts will unnecessarily consume SOC resources and impede effective threat response. In either case, the simulation model is able to estimate the occurrence and degree of redundancy among alerts and blocks on paths in the graph.

Examples of the present disclosure use a statistical approach in keeping with the overall stochastic flow model. The following process, described below, estimates: (1) the percentage of uneradicated threats passed from control to control in the flow graph that have previously triggered an alert; (2) the percentage of alerts passed in each alert transit object that are redundant (e.g., previously triggered an alert); and (3) the percentage of eradicated threats in each control that previously triggered an alert. AlertCorrleation, an input parameter to the model, sets the degree of expected correlation of redundant alerts and blocks with respect to individual threats. AlertCorrelation determines the extent to which threats that trigger alerts in a control will be the same threats that triggered alerts (if any) in previous controls on the path. AlertCorrelation also determines the extent to which threats eradicated by a control are likely to be the same threats that triggered alerts in previous controls in the path. An AlertCorrelation equal to zero percent means that threats that trigger alerts in a control, and threats that are eradicated in a control, are no more likely to be the same threats as threats that triggered alerts earlier on the path than other threats. An AlertCorrelation equal to one hundred percent means that threats that trigger alerts in a control, and threats that are eradicated in a control, are always the same threats (if any) as threats that triggered alerts earlier on the path.

The process may begin with the processing system defining: PercentAlerted as the percentage of uneradicated threats passed from one control to the next control along a path that have triggered an alert in at least one previous control on the path; defining PreviousPercentAlerted as the PercentAlerted value passed to each control from a previous control on a path; and NewPercentAlerted as the PercentAlerted value passed to subsequent controls on a path.

Next, the processing system may set the CurrentPercentAlerted and NewPercentAlerted for each control. In one example, $$CurrentPercentAlerted = \frac{CurrentAlerted}{(CurrentAlerted + CurrentUndetected)} \quad \text{(EQN. 1)}$$

and

-continued $$NewPercentAlerted = AlertCorrelation *$$ (EQN. 2)
$$max(PreviousPercentAlerted, CurrentPercentAlerted) +$$
$$(1 - AlertCorrelation) * (PreviousPercentAlerted +$$
$$(1 - PreviousPercentAlerted) * CurrentPercentAlerted)$$

Next, the processing system may set, in the alert transit object created by each detection-response control that may trigger alerts:

RedundantAlertPercent=

AlertCorrelation*min(PreviousPercentAlerted,

CurrentPercentAlerted)+

(1−AlertCorrelation)
\*PreviousPercentAlerted\*CurrentPercentAlerted (EQN. 3)

Next, the processing system may set, for each control:

BlockedPercentPreviousAlerted=

AlertCorrelation*min(PreviousPercentAlerted,

CurrentPercentEradicated)+

(1−AlertCorrelation)
\*PreviousPercentAlerted\*CurrentPercentEradicated (EQN. 4)

Finally, if the SOC analytics strength is one hundred percent (or to a proportionate extent if SOC analytic strength<100%), then the quantities calculated in EQNs. 3 and 4 may be applied by the processing system as follows. RedundantAlertPercent, as calculated in EQN. 3, may cause multiple alerts to be correlated and combined into a smaller number of alerts, eliminating the redundancy with a higher confidence level (and, thus, a higher priority for SOC analyst processing). BlockedPercentPreviousAlerted, as calculated in EQN. 4, may eliminate spurious or moot alerts from the count of alerts generated by detection-response controls.

Once the control flow graph has been constructed, the method 200 may proceed to step 206. In step 206, the processing system may calculate, for each path of the control flow graph, a metric that quantifies the efficacy of the controls along the path in countering threats, where the calculating results in a plurality of metrics being calculated for a plurality of paths of the control graph.

In one example, the metric calculated in step 206 is an eradication metric that represents control effectiveness. Within the context of the present disclosure, "eradication" is understood to refer to the percentage of threats encountering a particular control that will be detected and blocked by that control. Thus, zero percent eradication represents a control with no effect (or a placeholder for a missing control), whereas one hundred percent eradication represents a theoretical absolute control through which zero threats escape. In this simplified context, each control in the flow graph may be assigned an eradication percentage as a static input parameter. One example of a method for deriving the eradication percentage for a control is described in further detail below.

In one example, aggregate eradication over a path is calculated as the accumulated eradication of controls up to each node on the path. Thus, the cumulative or aggregate eradication after node n may be calculated as:

$$100\% - \Pi_{i=1}^{n}(100\% - eradication_i)$$ (EQN. 5)

Thus, for instance, considering an example path consisting of three control nodes of seventy percent, ninety percent, and fifty percent eradication, respectively, the aggregate eradication over the path would be 100%−(30%×10%× 50%), or 98.5%. This is equivalent to a standard computation of compound probability of a threat going undetected by multiple independent controls along a path sequence (the case where actions of multiple controls are correlated and not independent is considered below).

Model inputs related to eradication are random variables, and there are some considerations related to precision and accuracy that may be considered important for the credibility and usefulness of the model. These considerations include: (1) the management of uncertainty; and (2) data sources.

With respect to the management of uncertainty, most model inputs are estimated and entered as ranges rather than as single numbers or values. Examples of the present disclosure use three- or four-point ranges (e.g., minimum, most likely, maximum, (confidence level)) as inputs to BetaPERT distributions. Range estimation with statistical distributions is important in capturing the uncertainty associated with input values. Uncertainty in eradication inputs may come from two sources: (1) the error associated with any measurement or estimation of real-world phenomena; and (2) the variance in the operation of a control faced with a diverse population of incoming threats. Use of statistical distributions (such as BetaPERT) allows the model to track the degree of uncertainty as well as the magnitude of numerical quantities.

EQN. 5 remains unchanged by range entry; however, EQN. 5 becomes a stochastic calculation over distributions rather than simple arithmetic over scalar numbers and is most easily calculated with a Monte Carlo simulation. Eradication and other calculated metrics related to control strength or control behavior are statistical distributions rather than single numbers.

With respect to data sources, while precision is relatively unimportant in decision support, and range estimation is useful in capturing degrees of precision, accuracy is important for credibility and usefulness. Inputs related to control effectiveness can be estimated with reasonable accuracy using calibrated subject matter experts with estimation techniques such as weighted averaging to minimize the impact of biases. However, historical or empirical data are useful for increasing accuracy when available. Model input metrics are designed for use with external data sources, such as penetration testing and breach and attack simulation (BAS) tools, which are well positioned to provide empirical measurements of control behavior.

In one example, branching percentages may also be obtained via calibrated expert estimation. However, there are many industry data sources useful for assisting and increasing accuracy. Data sources reflect patterns and trends in historical cyber attacks.

In step 208, the processing system may construct a threat strength distribution comprising a statistical distribution of observed strengths of the threats to the IT infrastructure. In one example, the concept of eradication (or detection strength) as a percentage of incoming threats in the control flow model relies on an implicit assumption that all threats are equivalent in sophistication and strength, or at least that all threats conform to the same distribution of strength levels. In reality, however, the threats faced by organizations vary widely in attack techniques and strength, and different cyber threat communities show substantially different ranges of sophistication. Nation-state actors, for example, tend to be far more sophisticated, better resourced, and armed with stronger tools, than criminal gangs, who are themselves much stronger than casual or opportunistic hackers (who may simply deploy scripts and other tools widely available on the Internet or take advantage of easily exploitable weaknesses when available). There is typically no direct visibility or data on the characteristics, sizes, or activities of these communities, and examples of the present disclosure do not attempt to characterize these communities explicitly. Instead, examples of the present disclosure define threat strength distributions, which represent diverse ranges of threat strength occurring in different environments as statistical distributions. Specific threat strength distributions reflect not invisible communities of actors, but observable incident characteristics, such as attacker goals, motivations, and capabilities.

In one example, threat strength distributions are defined relative to a threat strength continuum (i.e., a percentile scale running from zero percent to one hundred percent). In this case, lower continuum values reflect weaker threats (such as the casual hackers), whereas higher continuum values reflect stronger threats, and continuum values close to one hundred percent represent virtually unstoppable threats. Each threat strength distribution is embodied by a probability density function which is graphically shown as a curve with the threat continuum on the x-axis and relative probability on the y-axis. The area under the curve totals one hundred percent and represents the universe of threats. The height of the curve at each point shows the relative amount of threats at the corresponding strength level on the x-axis.

Figure 9A:
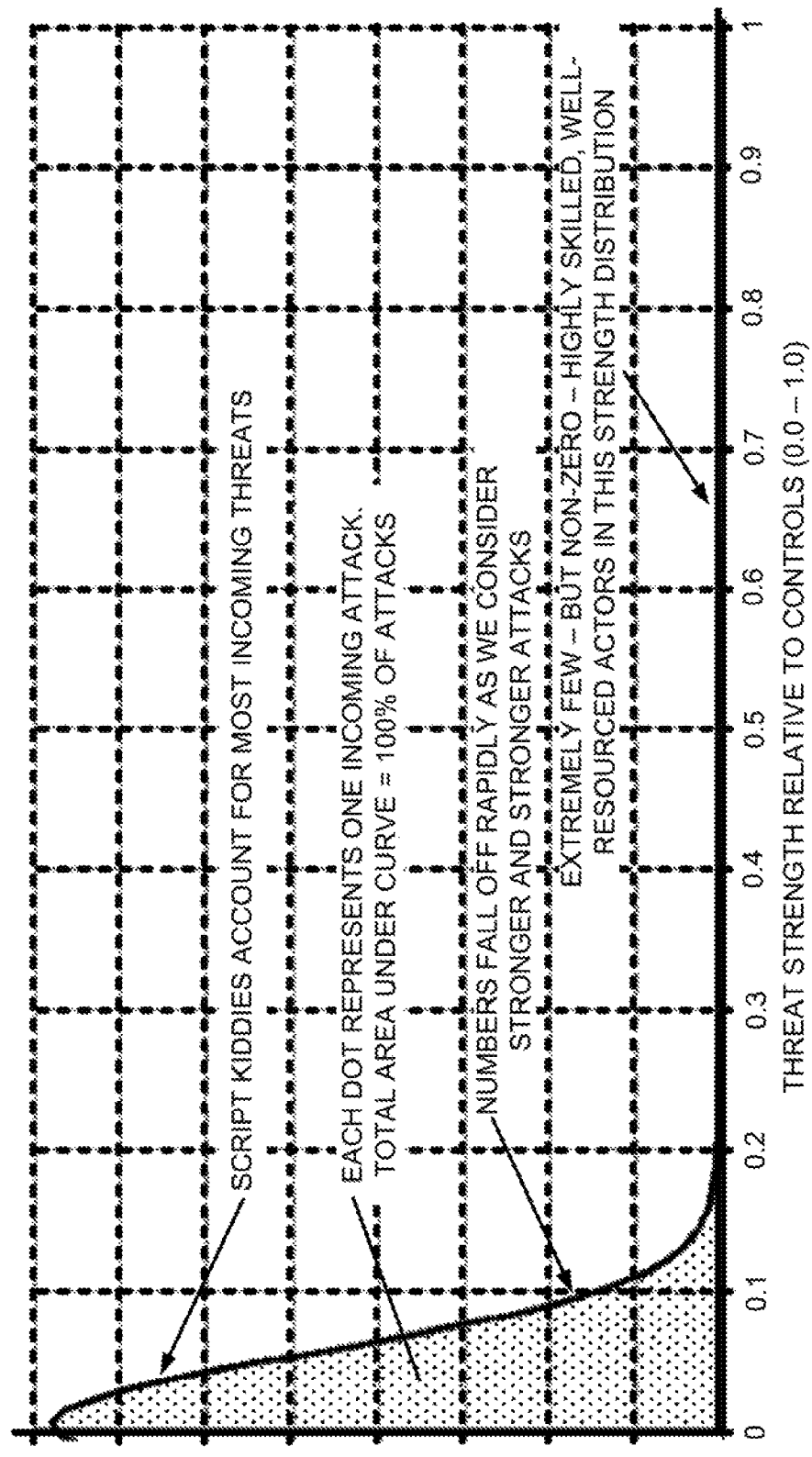
FIGS. 9A-9C show three example threat strength distributions.
Figure 9B:
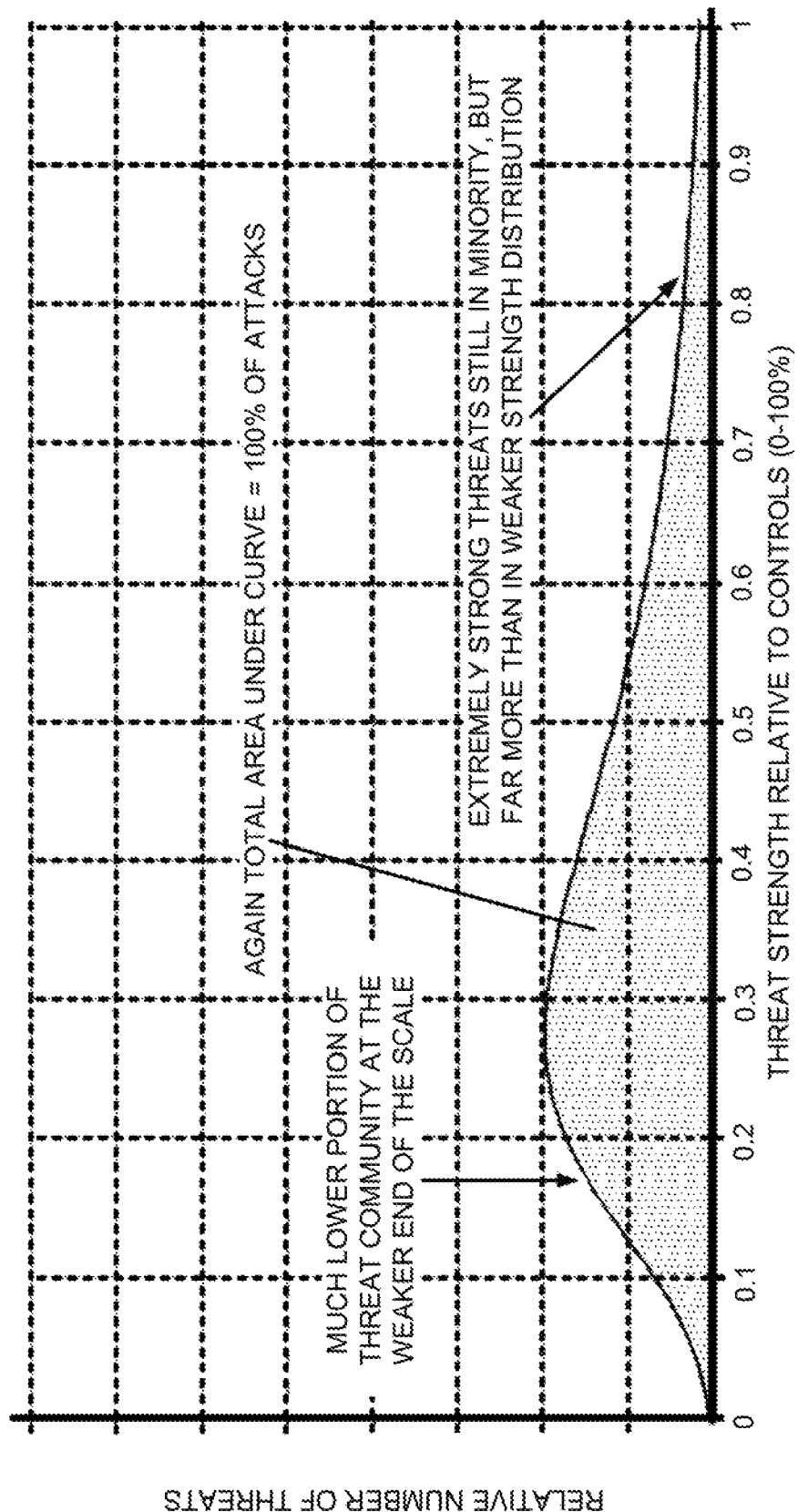
Figure 9C:
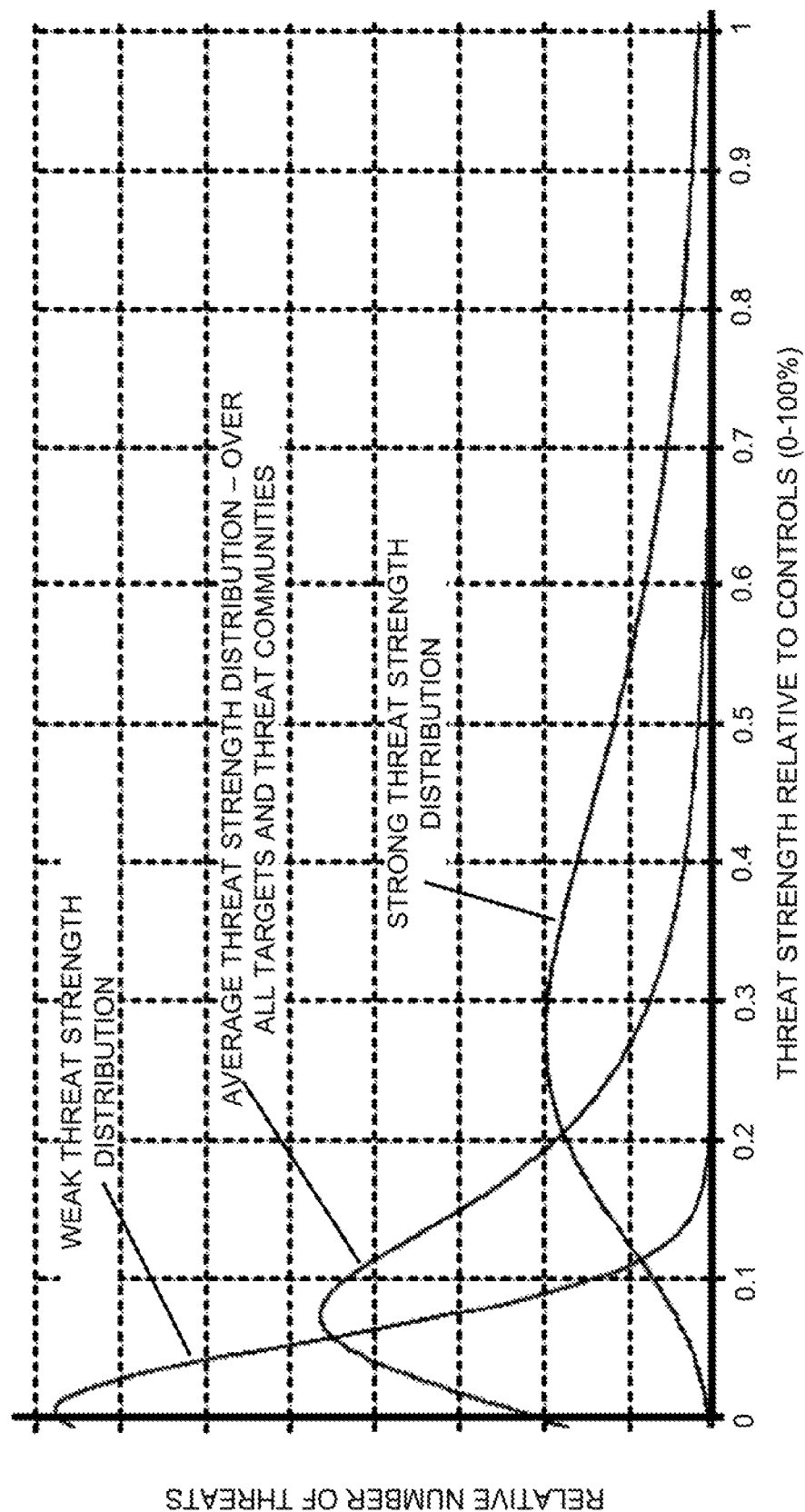

FIGS. 9A-9C, for instance, show three example threat strength distributions. In the weak distribution 900 (FIG. 9A), most, though not all, threats are relatively weak. The distribution is highly skewed to the left, meaning that the curve is much higher toward the left or weaker end of the threat continuum. The curve quickly descends toward zero moving to the right, though there is a non-zero tail indicating that even a weak distribution may include a small number of strong threats.

The strong distribution 902 (FIG. 9B) also includes both very weak and very strong threats, but the bulk of the threats are far stronger than the threats depicted in the weak distribution 900 of FIG. 9A. The peak (mode) of the distribution in FIG. 9B is much further to the right, indicating that most threats in the strong distribution 902 are moderately strong to strong. The tail to the right in FIG. 9B represents the smaller (vanishing to zero) number of threats that are extremely strong; the tail to the left in FIG. 9B represents the smaller number of threats in this community that are weak.

Finally, FIG. 9C shows the three example threat strength distributions, i.e., the weak distribution 900, the strong distribution 902, and an average distribution. The average distribution occupies the middle range between the weak distribution 900 and the strong distribution 902.

In one example, control actions are simulated in the full model relative to one of the threat strength distributions (e.g., one of the threat strength distributions shown in FIG. 9C). The threat strength distribution is selected according to the type of organization or other factors. For example, a large bank or a semiconductor design house, either of which could represent a prime target for highly sophisticated attackers, might use a strong distribution (e.g., strong distribution 902), whereas for a large retailer or a small entertainment chain, an average or weak distribution (e.g., average distribution or weak distribution 900) might be more appropriate. It is possible to run the model with multiple threat strength distributions in effect concurrently, in which case results from the different threat landscapes will be shown together.

As simulated threats traverse a path through the control flow graph, the simulated threats are detected and consumed by controls along the path according to the threat strength distribution in effect. The threat strength continuum (x-axis of the distribution function) was defined above as a scale of threat or attacker sophistication and capability. The threat strength continuum also represents an increasing scale of aggregate control strength, as stronger control configurations are required to counter more sophisticated threats. Each point on the threat strength continuum reflects a particular combination of detection techniques, analytic strength, and logged contextual data for analysis purposes. Aggregate control action flows left to right along the continuum as threats flow left to right along paths in the control flow graph, and at each point in the control flow graph, the eradication of threats by controls is determined by the probability density (height) of the threat strength distribution currently in effect.

Thus, under the weak profile 900, controls of only moderate strength early on a path (e.g., beginning of the attack chain) will be able to detect and eradicate a large percentage of the incoming threats, as reflected by the relatively large portion of the area under the distribution curve occurring at the leftmost and weaker end of the threat strength continuum (see FIG. 9A). Remaining, stronger threats are fewer in number and will be largely detected later in the path as aggregate control strength accumulates. By contrast, under the strong distribution 902, fewer threats will be consumed early on the path unless initial controls are very strong, as the bulk of threats appear further toward the right and stronger end of the threat strength continuum (see FIG. 9B).

As threats flow from left to right along a path in the control flow graph, the threats become less numerous but stronger, because the weaker threats are eradicated by early-stage controls. Approaching the end (loss event) node at the rightmost end, only the strongest few threats will remain undetected and uneradicated. The detection strength of each control may be specified as a model input in context of the universe of threats facing the enterprise (i.e. relative to the threat event entry at the leftmost end of the attack chain graph 400 of FIG. 4). But the effective detection strength of a later stage control, as a percentage of incoming threats, will be substantially lower in the face of the stronger threat mix than in the identical control appearing earlier on a path. Hence, the model may dynamically adjust the effective detection strength of each control according to the control's position and to the flow of threats along a path.

In one example, the magnitude of the adjustment for each control may be determined by the threat strength distribution. Under a uniform (or flat) distribution, threats are evenly distributed along the strength continuum. No control strength adjustment is needed as controls exert identical detection effect regardless of the controls' positions on a path. Under the weak threat strength distribution (e.g., weak distribution 900 of FIG. 9A), controls toward the rightmost end of a path (e.g., approaching a loss event) may need substantial reduction in simulated effective detection strength, as only the few strongest threats remain active at that point on a path. A strong threat strength distribution (e.g., strong distribution 902 of FIG. 9B) results in a smaller reduction in detection strength, as the mix of threats encountered by controls late on a path more closely resembles the mix at the start of the path.

Following is a simple example of a method to calculate the detection strength adjustment. As discussed above, the detection and eradication action of each control on a path is effected relative to a specific point on the threat strength continuum, depending on the eradication action of previous controls. This procedure defines the path adjustment ratio as the ratio of the horizontal axis value at that point to the area under the distribution curve left of that point. With a uniform distribution, the path adjustment ratio is always one; with a skewed unimodal distribution (e.g., weak, average, or strong), the path adjustment ratio will fall between zero and one for all controls other than the first control on a path. One example method for calculating the detection strength adjustment for a given control includes a plurality of steps, outlined below. Each control inherits an aggregate eradication strength from the previous control (or zero for the first control on a path).

The steps are as follows. First, the processing system may set AdjustmentRatio as:

$$\frac{(InverseCumulativeFunction\ (PreviousAggreateEradication, ThreatrStrengthProfile\ ))}{(PreviousAggregateEradication)} \quad \text{(EQN. 6)}$$

where InverseCumulativeFunction is the inverse of the cumulative distribution function (CDF) corresponding to the threat strength distribution in effect.

Next, the processing system may obtain input parameters for the current control. The input parameters may include, for example, detection strength, coverage, and allow-alert percentage.

Next, the processing system may set:

EradicationStrength=DetectionStrength*AdjustmentRatio*Coverage*(1−AllowAlertPercent)  (EQN. 7)

Finally, the processing system may set the new aggregate eradication strength according to EQN. 5, above. The steps may be repeated for each control on a path.

The range of threat strength flowing along each path in the control flow graph reflects the successive effect of controls along the path; on paths with numerous strong controls, the remaining threats toward the rightmost end of the control flow graph will be quite different in strength range compared to the remaining threats on paths with fewer or weaker controls. However, there are many paths on a given control flow graph, and paths are intertwined due to branching and joining at control nodes. The control at each join node thus encounters a mix of threat populations with diverse ranges of strength characteristics.

In order to ensure a faithful simulation of the real-world threat environment, examples of the present disclosure retain the mix of diverse threat populations as the threat populations flow through the control flow graph. The model uses statistical mixture distributions to represent the collection of strength ranges (each strength range with its respective population size), flowing from node to node. Graphically, a mixture appears as a multi-nodal distribution (probability density function) in which each peak represents threats from a different path or sub-path, with height corresponding to the number of threats from that path. Each simulated control, then, applies the control's detection and eradication capabilities separately to each incoming threat population converging at that control.

The final output of the model will again be a mixture distribution potentially spanning a wide range of aggregate control strength, especially if converging paths vary widely in number or strength of controls. However, any undetected threat can cause a loss event, regardless of strength. Hence, for visualization and analysis purposes, this wide multi-modal mixture can be reduced to a count of surviving threats. That count, as a range percentage of the incoming threat events and subtracted from one hundred percent, represents the aggregate control strength distribution of the entire current control configuration with its corresponding input settings.

In optional step 210 (illustrated in phantom), the processing system may validate the model (which includes, e.g., the control flow graph and the threat strength distribution(s)). Testing for accuracy of model results is important for several reasons. Model inputs (e.g., parameters) can be iteratively adjusted and tuned in accordance with the reasonableness and fidelity of the outputs, which may result in increased accuracy and/or important insights into the interaction of inputs and outputs and hence into the operation and interaction of the modeled cyber controls). Further, the testing and refinement process may led transparency and credibility to the model's operation, enabling the model's application for security enhancements in organizations.

Examples of the present disclosure use cross-validation to enable accuracy testing against real-world conditions in an organization's cyber infrastructure. Cross-validation relies on data items that the organization collects in normal security operations (e.g., via software tools and/or administrative processes). Certain of these empirical data items will be used as inputs into the flow control graph/model as described. Other data items will be excluded from the model inputs and compared against model outputs.

One example of cross-validation uses data from the organization's threat monitoring and SOC tools to set the threat count model input in line with observed activity. The model utilizes the threat count along with other control and SOC inputs (including analyst resource capacity) to calculate forecasts of the numbers of processed and non-processed cases in the SOC. The forecasts can be compared against observations from the organization's SOC tools. Similar value ranges suggest that model inputs and processing are valid.

In step 212, the processing system may generate a visualization of the efficacy of at least one combination of the plurality of controls, based on the plurality of metrics (e.g., the eradication metrics), the control flow graph, and the threat strength distribution(s).

As discussed above, examples of the present disclosure utilize a set of visualization tools to facilitate cost-effective strengthening of cyber defenses through improvements in controls. Evaluation, selection, and implementation of control enhancements may involve a multi-phase decision procedure conducted by an organization's information security management team in concert with IT, finance, risk management, and other functions. Each phase of the decision procedure is guided and informed by the simulation model described above through the outputs and visualizations of the model.

An initial view of cyber security posture may be provided by visualizations in the control flow graph. The control flow graph represents a set of intertwined threat paths, or attack chain segments, where each threat path represents a different domain of susceptibility to cyber incidents. Visualizations in the control flow graph show which segments are critical for cyber security and identify weak points. For example, one organization might be especially susceptible to attacks on internally developed web applications, another organization might be especially susceptible to phishing-induced malware, and another organization might be equally susceptible to several attack types, and the controls relating to exfiltration of data regardless of attack type are most critical.

A first visualization shows relative strength and weakness in path segments in the control flow graph. This is a measure of threat detection or eradication failures critical to cyber posture along each edge of the control flow graph. Detection failure is non-critical when undetected threats can be detected and eradicated by later controls on a path, and critical when the failure leads to a successful attack. In one example, the critical path weakness visualization is developed by a backward (e.g., right to left) scan through the control flow graph, starting with loss events and tracing the control detection failures that led to the loss events. It one example, the control detection failures may be displayed using color saturation levels (e.g., where controls displayed in brighter and darker colors are the controls most responsible for incidents causing losses). The visual display, an example of which is discussed above in connection with FIG. 8B (in which color intensity is represented by density of cross hatching), provides a high-level conceptual view of the sources and factors in cyber risk that require further analysis. Additional path-based color saturation displays may indicate the relative eradication effect of controls in the control flow graph, and other information that is useful in developing a full view of the overall functioning, strengths, and weaknesses of the control configuration.

In one example, sensitivity analysis refines the critical path weakness view with a finer-grained quantitative display of the relative importance, and of the shortcomings and opportunity for strengthening, of each individual control in the context of the specific risk scenario. During sensitivity analysis, each control is increased and decreased in strength in turn, to measure the resulting impact on the aggregate strength of the overall configuration. In one example, the results of the sensitivity analysis may be displayed as a tornado chart (e.g., a standard technique for displaying relative importance of model factors in a top-down display).

Figure 10:
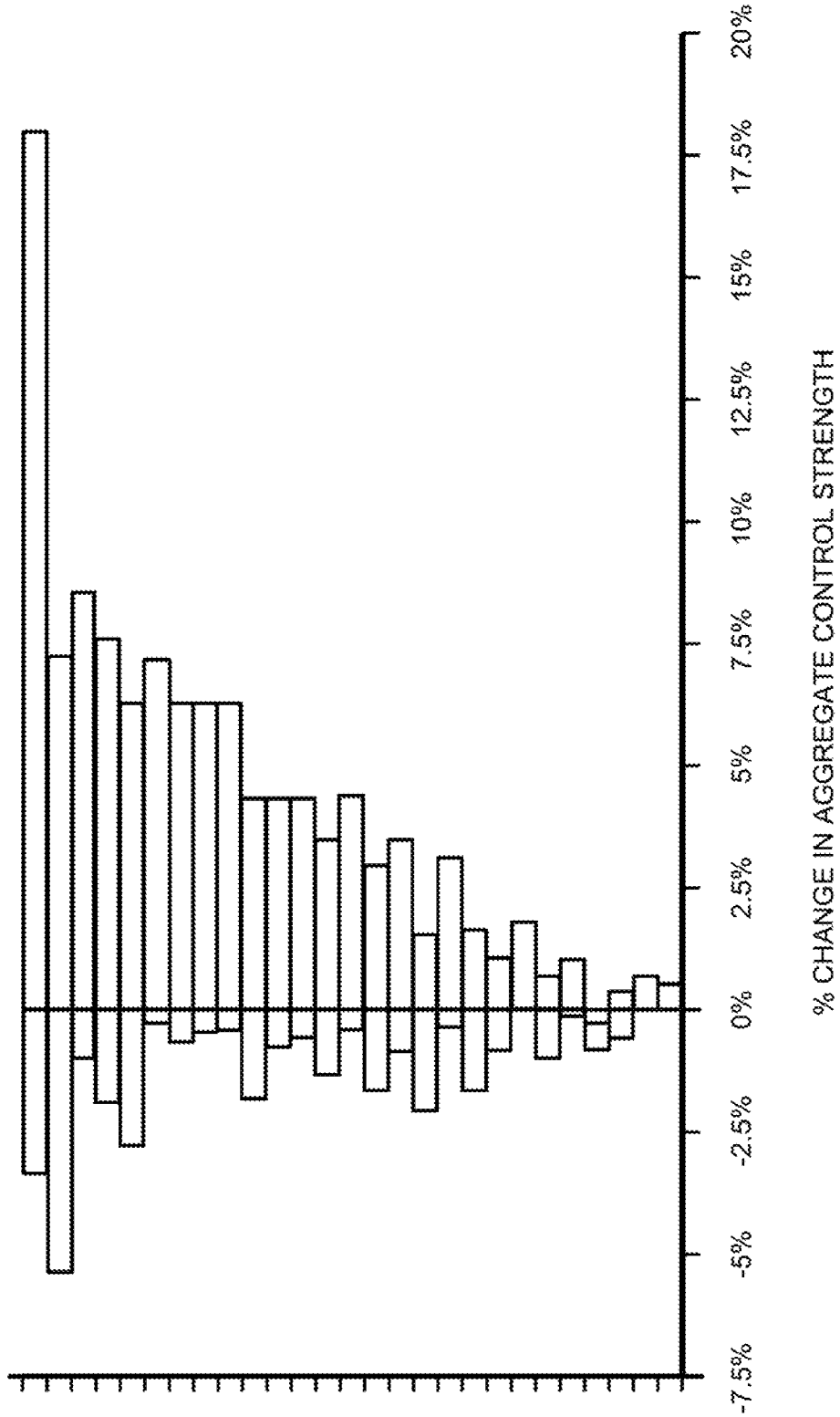
FIG. 10 illustrates an example tornado chart that may be created in accordance with the method of FIG. 2.

FIG. 10 illustrates an example tornado chart 1000 that may be created in accordance with step 212. The vertical axis of the tornado chart 1000 lists individual controls in the control flow graph, while the horizontal axis of the tornado chart 1000 shows the relative change (plus or minus) in the calculated aggregate control strength. The total horizontal length of the bar for each control indicates the importance of the corresponding control relative to aggregate control strength. Controls are sorted so that the controls with the greatest impact (represented in FIG. 10 by the widest bars) appear at the top of the tornado chart 1000 (thus the "tornado" appearance).

Each bar of the tornado chart 1000 extends to the left and to the right from the zero point on the horizontal axis. The length of the bar to the left of the zero point indicates the percentage decrease in aggregate control strength (or equivalently, the increase in risk) that would result if the corresponding control were removed or made inactive within the current configuration. The length of the bar to the right of the zero point shows the percentage increase in aggregate control strength resulting from a strengthening of the corresponding control to a maximal strength.

The maximal strength of the corresponding control is not a theoretical ideal, but a realistic full exploitation of the capabilities of the technology or process underlying the corresponding control. In terms of model inputs, the maximal strength involves setting the coverage of the corresponding control to one hundred percent and the detection strength of the corresponding control to the maximum of the range specified for the control family. Thus, the bars extending to the right of the zero point in the tornado chart 1000 provide a ranking of opportunities for increased security obtainable by enhancing individual controls.

However, the tornado chart 1000 does not show the potential value of combinations of control enhancements, or of combinations of individual changes to coverage, detection strength, or other specific model inputs/parameters relevant to controls or other elements. For these more complex comparisons, examples of the present disclosure provide "what-if" scenarios as a conclusive visualization and decision tool.

The impact and value of proposed control enhancements or alternative control portfolios can be tested by constructing and measuring "what-if" scenarios. Each what-if scenario may include any number of changes to control or SOC input parameters, allowing a comprehensive measurement and assessment of enhancement options.

The resulting impact on control strength for each what-if scenario may be shown relative to: (1) an industry baseline value, constructed using data-guided estimations based on typical industry control configurations for several tiers of more and less cyber-sophisticated organizations; and (2) a client baseline value, reflecting a particular organization's current or baseline cyber stature.

In addition to the incremental control strength, comparisons of impact for each what-if scenario may be shown in terms of financial risk to the organization. Financial risk may be calculated using historical data on expected frequency and financial impact of cyber incidents similar to the risks of concern. This historical data may be developed and modeled using known regression techniques.

In one example of the present disclosure, financial risk may be displayed as a loss exceedance curve (LEC) (also known as an exceedance probability curve or a complementary cumulative distribution function). An LEC is a known statistical technique for displaying a risk forecast in terms of the probability of a given magnitude of loss over varying time periods. An LEC is useful for catastrophic risks such as cyber risks in which the events of greatest concern impose large financial losses but occur rarely.

Figure 11:
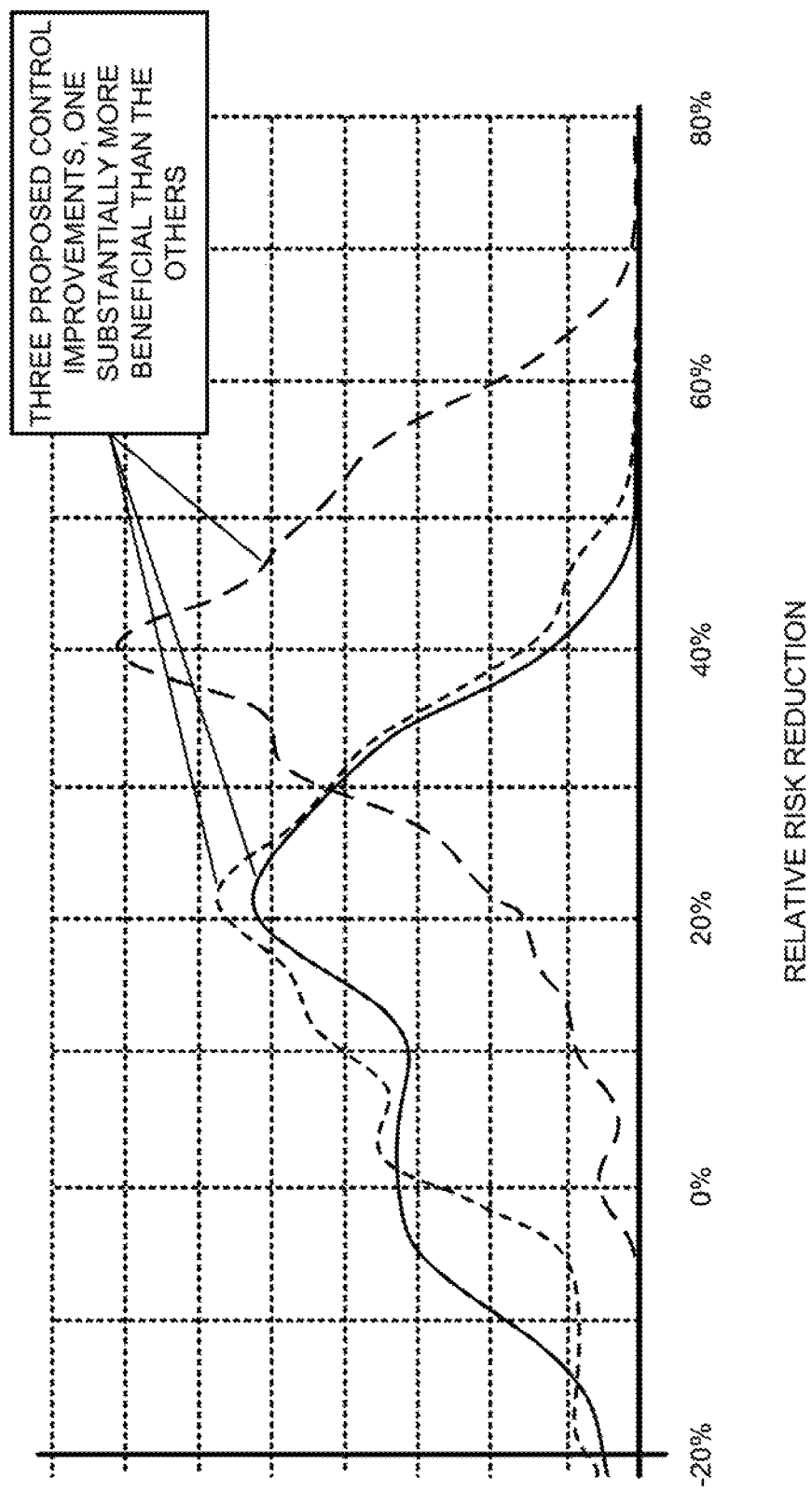
FIG. 11 illustrates an example of a graph 1100 showing a set of what-if scenarios.

In a further example, a set of what-if scenarios can be displayed in a single graph showing relative impact on cyber risk. This display facilitates selection and evaluation of the most effective and optimal courses of action to improve security posture. FIG. 11 illustrates an example of a graph 1100 showing a set of what-if scenarios.

In step 214, the processing system may identify, based on the visualization generated in step 212, a weakness in the plurality of controls. For instance, as discussed above in connection with step 212, analysis of one or more statistical visualization tools (such as path analysis of the control flow graph, sensitivity analysis using a tornado chart, or what-if scenario testing) may indicate an area where a specific control of the plurality of controls may cause an unacceptable weakness in aggregate control strength. While the specific control may be acceptably strong, the visualization may show an area where the specific control should potentially be strengthened or improved.

In step 216, the processing system may modify the plurality of controls (i.e., modify at least one control of the plurality of controls) based in the identification of the weakness, in order to address the weakness (e.g., to strengthen the controls). In some cases, the processing system may be able to modify at least one control directly, e.g., without human intervention. For instance, the processing system may be able to act autonomously to download, install, and/or execute a software update (e.g., a patch) to a firewall to address a weakness in the firewall. In another example, however, the processing system may make recommend an action to be taken by a human operator or analyst. For instance, the processing system may recommend that training users of the IT infrastructure undergo training to recognize emerging types of attacks. Thus, a remediation strategy may be deployed to strengthen the plurality of controls against a threat.

The method 200 may end in step 218.

In some examples, refinements and augmentations may be made to the method 200 for a sufficiently faithful simulation of cyber reality. For instance, in one example, multiple concurrent flow control graphs may be constructed. Organizations face multiple types of cyber risks (i.e., multiple potential loss events and threat scenarios in the classification scheme described above). Some controls apply to multiple threat scenarios. For example, an anti-malware endpoint agent is an important defense against both data breach and ransomware; behavioral analytics (anomaly detection) applies to both malicious insider and accidental threat scenarios. Hence, a model of the control effectiveness may encompass multiple control flow graphs concurrently. A single change to control input parameters could impact the aggregate control strength, and, thus, business risk for several loss event or scenario types.

In another example, the flow control graph may account for control coverage. Controls may not always be installed or applied consistently or universally throughout the enterprise, and where the controls are not applied, the controls may have no effect against threats. A metrics referred to as "control coverage" may be used to refer to the extent of the application of a control.

In further examples (e.g., examples including detection-response controls and the SOC), the eradication metric for a control may be derived by the simulation engine from input parameters specified by the user. The input parameters are described in greater detail below. Detection strength, in this context, differs from eradication strength in that detection strength indicates the percentage (i.e., range) of incoming threats that are detected by the particular control regardless of the action taken (block versus alert) and regardless of control coverage. For a non-detection-response control with one hundred percent coverage, the eradication percentage may be set equal to the detection strength.

In further examples, cost-benefit modeling may be used to find a range of enhancements to the IT infrastructure. Controls may differ significantly in cost, and organizations may have different budgetary, resource, or political constraints relative to cost. Cost components may be direct or indirect, and short-term or long-term. Selection of controls or control enhancement actions requires examination of business feasibility as well as efficacy of different options. Cost-benefit modeling may be used to find a range of enhancement portfolios that are relatively optimal with regard to these tradeoffs.

Furthermore, it is worth noting that successive controls on a given path in the control flow graph may be, to varying degrees, either correlated or independent in their threat detection techniques and scope. Diversity of control mechanisms, potential redundancy among controls, and combined effectiveness may be taken into account in modeling aggregate control behavior and efficacy. In particular, when a control's eradication strength is increased (or decreased), the model must consider the impact of that improvement (or reduction) on the effectiveness of neighboring controls.

Control improvement testing may be performed during both sensitivity analysis and what-if scenario modeling, discussed above. Due to potential redundancies, it cannot be assumed that a given percentage improvement in a control will result in a fully commensurate improvement in aggregate eradication strength.

Independence of a given control relative to other controls on a path of the control flow graph may be indicated by the given control's differentiated capacity (or "diffcap"), an input parameter. A diffcap of zero means that the control is not at all independent from (i.e., is highly correlated with) neighboring controls. A diffcap of one hundred percent means that the control is completely independent of other controls.

Figure 12A:
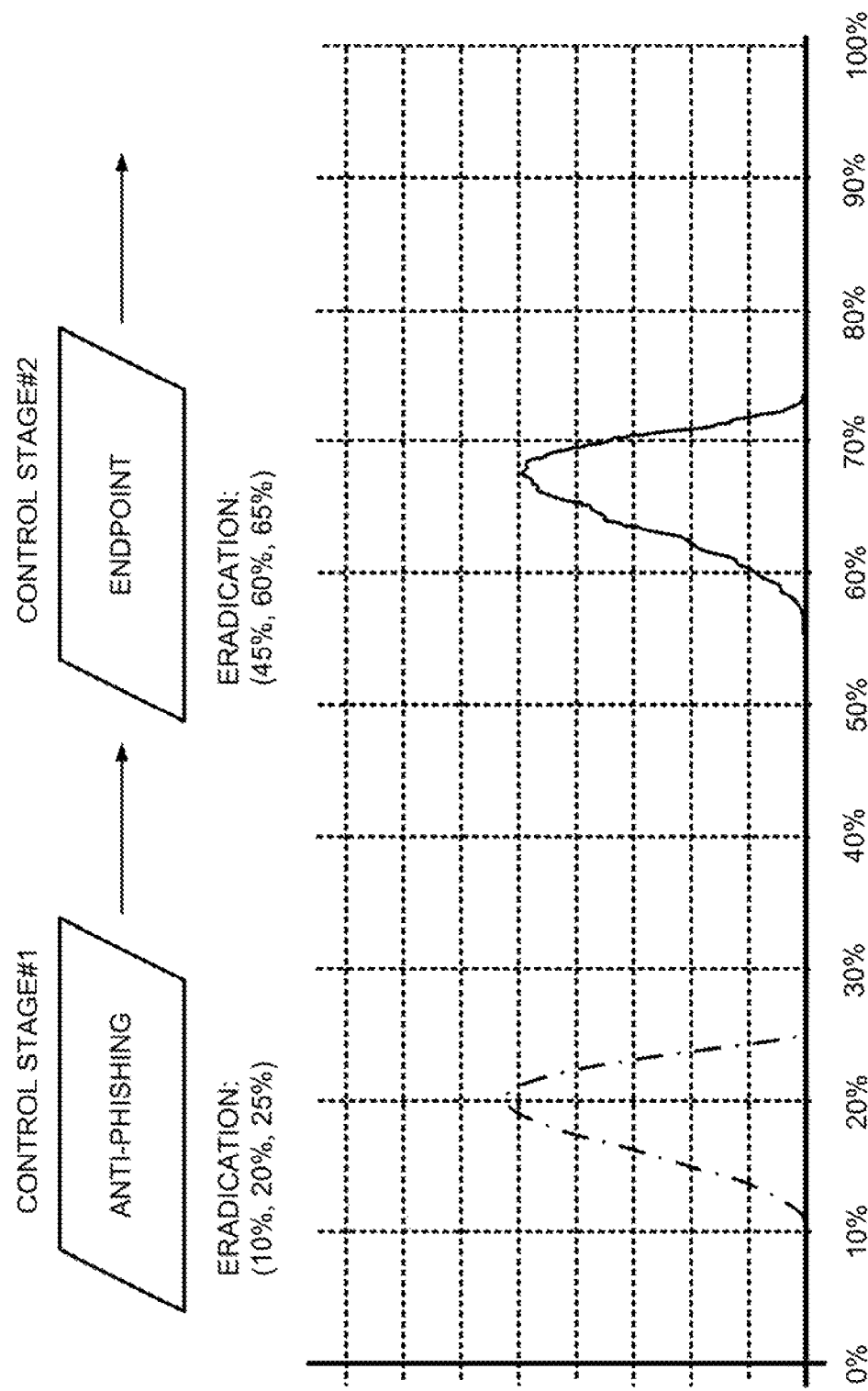
FIGS. 12A-12E illustrate an example of non-independent controls.
Figure 12B:
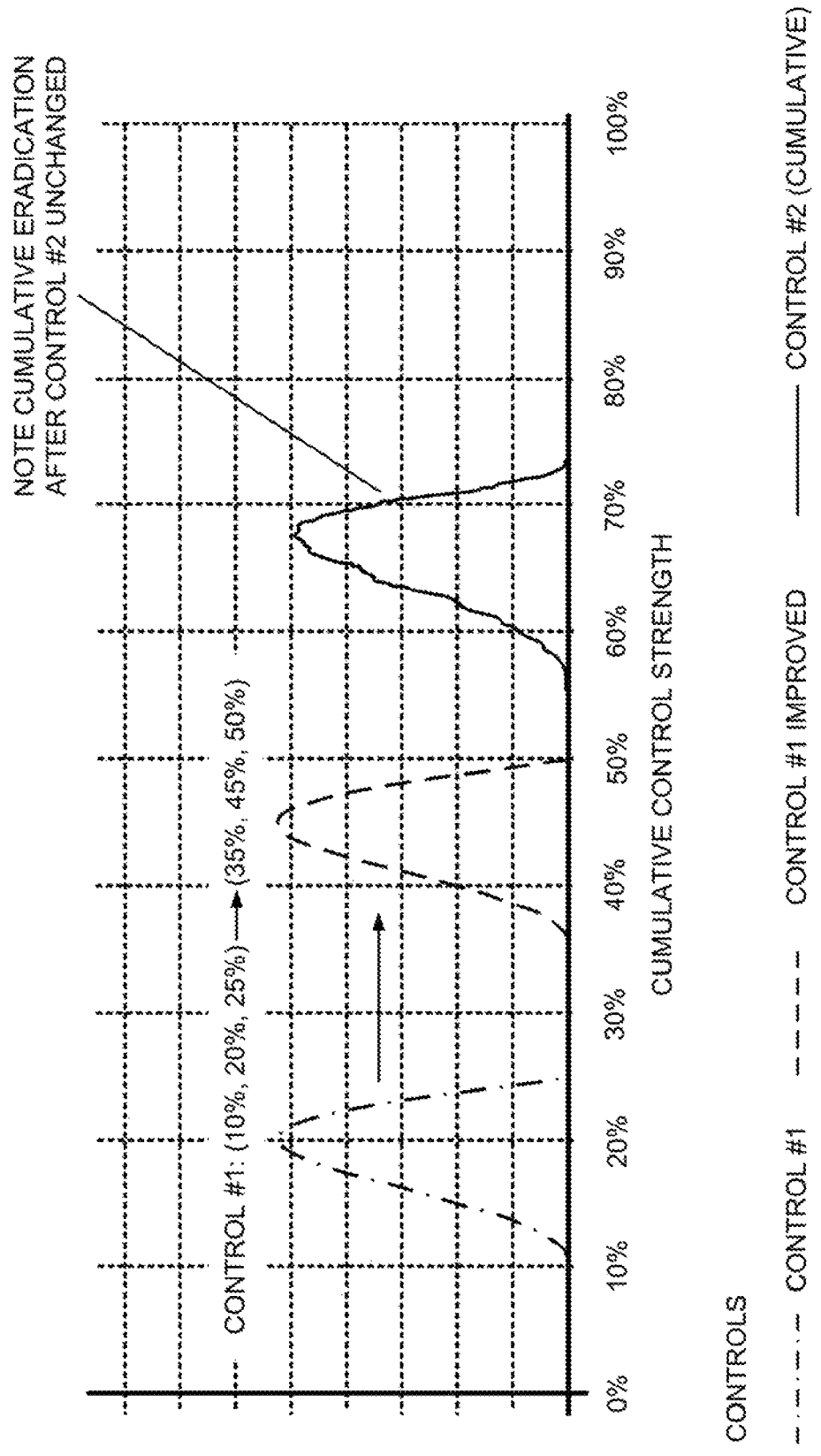

FIGS. 12A-12E illustrate an example of non-independent controls (controls with low diffcap). FIG. 12A shows two successive controls, Control #1 and Control #2 on a graph 1200. The horizontal axis in the graph 1200 represents the cumulative eradication after each control. In FIG. 12B, eradication of Control #1 is increased by a modest amount, while Control #2 is unchanged. Non-independence means that Control #2's profile of detectable threats is similar to Control #1's profile of detectable threats; furthermore, Control #2 employs a fixed set of detection techniques and is unable to intercept any stronger or different threats than previously. However, Control #2's input threat stream is now stronger, though smaller, because Control #1 consumes a larger share of the weaker threats due to Control #1's increased eradication. Hence the effective eradication of Control #2 decreases such that the combined aggregate eradication is unchanged or only slightly changed by the improvement in Control #1. Thus, the proposed improvement is of minimal value.

Figure 12C:
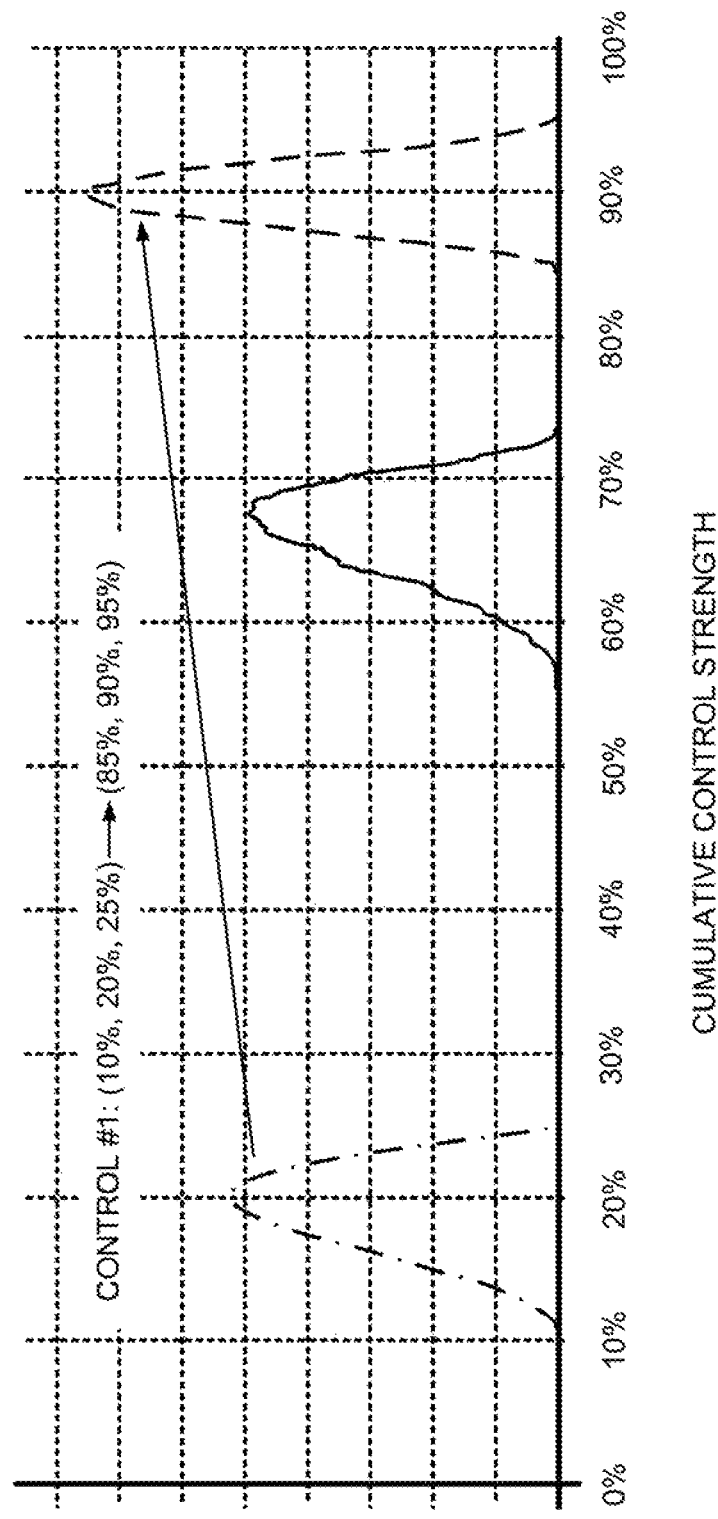

FIG. 12C shows a similar situation to FIG. 12B, but with a much larger eradication improvement for Control #1. In this case, the effect of Control #2 decreases essentially to zero. Control #1 has leapfrogged Control #2 such that Control #1's eradication is equal to the cumulative eradication of both Control #1 and Control #2 in combination. This improvement measurably increases aggregate control strength and reduces risk.

Figure 12D:
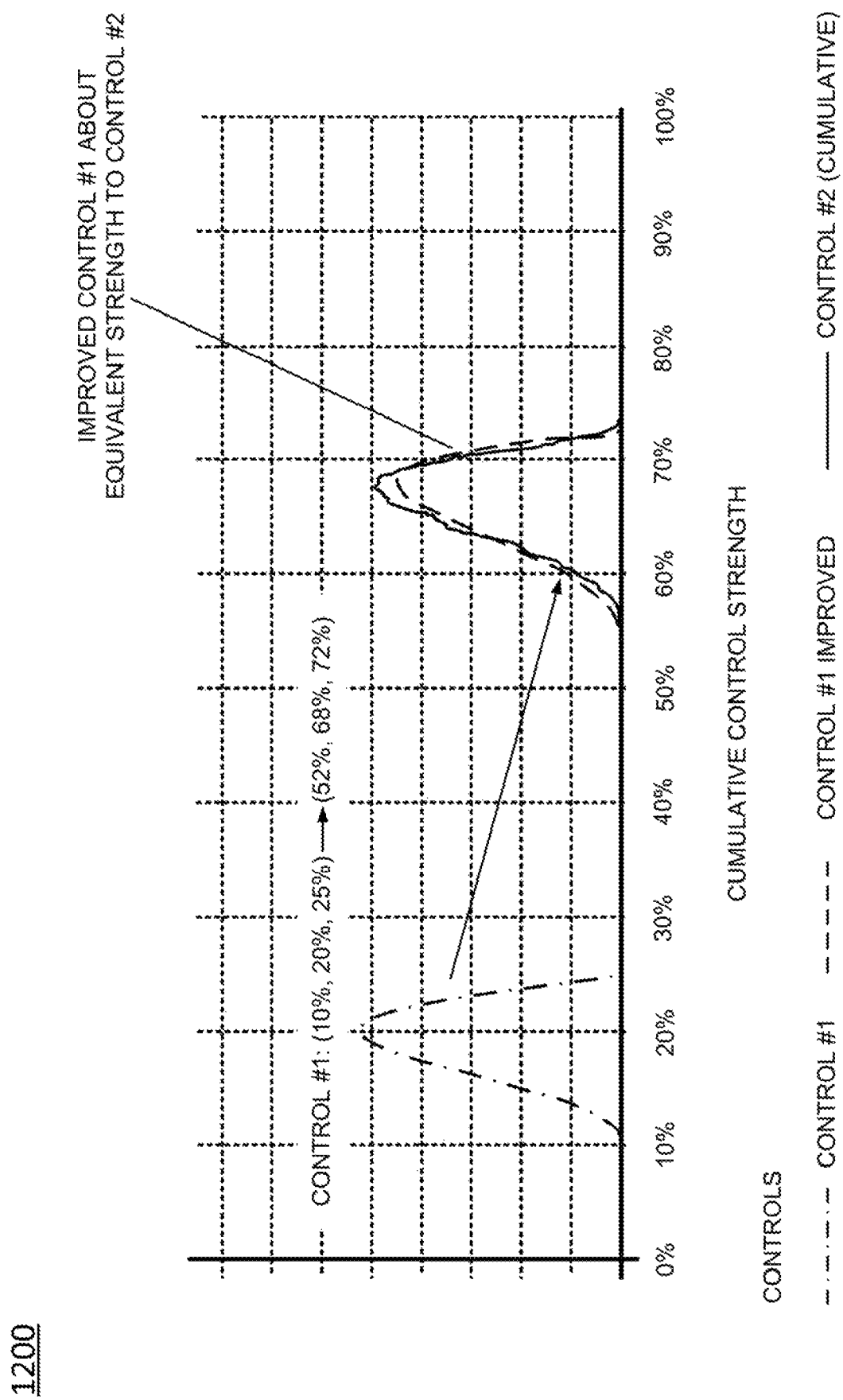
Figure 12E:
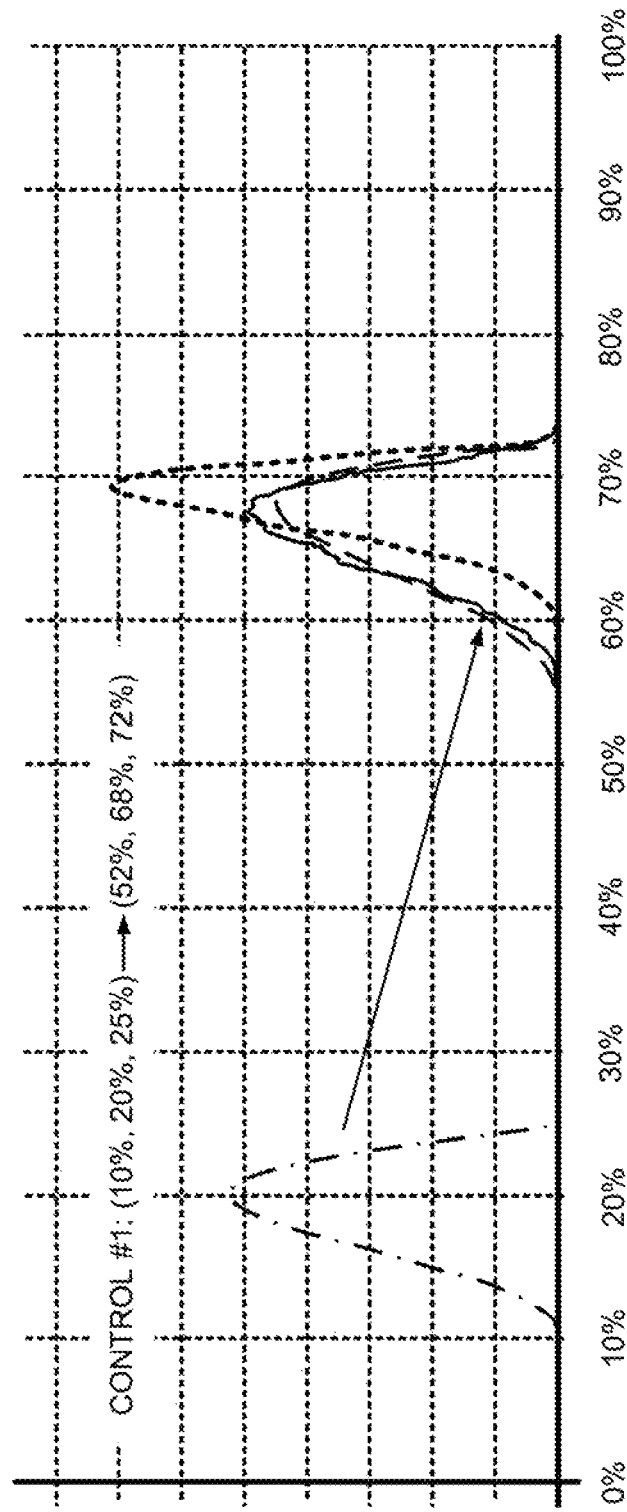

Finally, FIGS. 12D and 12E illustrate an intermediate case in which the eradication improvement in Control #1 brings the cumulative eradication to about the same range as the (unchanged) cumulative eradication after Control #2. The value of this eradication improvement appears questionable. However, while Control #1 and the combination of Control #1 and Control #2 are now similar in eradication, they use different detection techniques. Furthermore eradication is a statistical distribution in which detection of a specific threat is a random variable. Cumulative eradication may be enhanced by the fact that each of these apparently redundant controls may be effective in cases where the other is not. Hence, the model calculates cumulative eradication as the stochastic maximum (i.e., the likelihood of detection by either Control #1 or Control #2 for each sample in a Monte Carlo simulation) of the two controls. The stochastic maximum distribution, shown as the curve in FIG. 10E with the highest peak, has a tighter range and higher mean strength than either Control #1 or Control #2 individually.

Aggregate impact of control improvements is more straightforward in a case of high diffcap. An eradication improvement in one control has little impact on the contribution of a successive control, as the successive control's high diffcap indicates that the successive control's detection techniques are sufficiently uncorrelated with those of the improved control, and, furthermore, that the successive control is capable of scaling to respond to a stronger set of input threats without losing efficacy. The effective eradication and percentage contribution of the successive control to the cumulative eradication remain relatively unchanged, and in a scenario like the above, an improvement in Control #1 results in a corresponding shift to the right in the cumulative eradication of Controls #1 and #2.

As mentioned above, any given control may be applied only partially over the entities in the enterprise where the given control is relevant. For example, technical controls like host endpoint agents, network firewalls, or data encryption might be reserved for selected devices, network subnets, or databases according to perceived risk, in order to minimize costs or organizational overhead or business friction. Employee training, extensive procedural audits and enforcement, or rigorous application security testing might be limited to critical areas for similar reasons. In one example, a calculation of control efficacy considers the extent of the application of the control as well as the control's detection and eradication capabilities.

In one example, the coverage input varies from zero percent to one hundred percent for any control, where zero percent coverage indicates an uninstalled or unapplied control (or perhaps a placeholder for a new control under consideration), and one hundred percent coverage indicates a control that is universally applied and enabled.

Related to coverage is the notion of asset criticality. Within each class of entity, some class instances may involve greater risk factors than others. For example, a database server or web application containing sensitive customer data might be considered more critical than an employee workstation or a meeting scheduling application; an employee with a high level of privilege or administrative access to data is more critical from the standpoint of data breach risk than another employee. An organization might consider control coverage relative to asset classes, as one hundred percent coverage may be unnecessary or unaffordable for non-critical entities when there are significant costs involved.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

The usage of the simulation model described above involves the identification and assessment of the most impactful strategies for investment for increased cyber resilience. However, alternative strategies may differ significantly in cost. Costs of cyber controls may be direct, indirect, or organizational. Analysis of these costs and resulting tradeoffs informs the selection of a cost-effective control improvement portfolio that is optimal and feasible in terms of the organization's budget and cost constraints.

Examples of the present disclosure may utilize optimization techniques such as mean-variance analysis to calculate an efficient frontier showing various cost-optimal portfolio alternatives for security enhancement. Within the context of the present disclosure, an "optimal portfolio" means that no different set of investments can be found with a better return in risk reduction at a given level of expenditure. In practice, security investment decisions may be based on a variety of quantitative and non-quantitative factors, and it is useful to provide several reasonably efficient portfolio alternatives rather than to focus on absolute optimality. The efficient frontier may provide a graphical display of multiple cost-effective options and cost tradeoffs.

Portfolio optimization may be applied relative to an organization's particular set of salient cost concerns specified using a standard taxonomy of cost components. The taxonomy is useful because, unlike other types of investments, cyber controls often must be funded, maintained, and supported by a variety of organizational functions which may have distinct individual budgetary or resource constraints and, hence, different tradeoffs. In one example, control costs fall into the following categories: vendor costs, internal resource costs, and business friction costs.

Vendor costs may include initial costs (e.g., license fees as well as onboarding, training, and other services), regular recurring costs (e.g., subscription and support fees), and irregular costs (e.g., consulting and other services, as required).

Internal resource costs may include initial costs (e.g., training, installation, socialization, and coordination among groups) and ongoing maintenance and support by groups responsible for the functional areas to which the controls pertain (specific activities may include control policy creation and maintenance and prioritizing alerts generated by a control). A list of functional/organizational areas may be specified as a model input parameter. Examples include information security (operations, risk management, vendor relations), information technology (various functions), HR and identity management, compliance and legal, finance operations, corporate vendor management, and others.

Business friction costs may include general costs (e.g., authentication process or tool usage restrictions that affect all employees or organizational functions) and specific costs (e.g., software development processes or requirements that impede product time-to-market velocity).

For each cost element, a weighting factor may allow an organization to specify the importance of the item in their decision landscape. A set of weighting factors may comprise a complete characterization of the organization's cost constraints and factors that must be traded off against the benefit of any control enhancement portfolio. Examples of the optimization algorithm take this complex cost landscape into account in identifying the best options for maximizing return on investment at any level of budget expenditure, while minimizing the costs and business friction from a larger enterprise standpoint.

As discussed above, in order to capture the uncertainty inherent in risk analysis inputs, most numerical inputs estimated by the user or consulting subject matter experts are entered as three-point ranges (e.g., minimum, most likely, and maximum) for input into a BetaPERT distribution. Wider ranges indicate greater uncertainty. Inputs derived from external data sources or regression models may be provided using other statistical distributions, most typically normal, lognormal, or beta. Grouped numerical inputs which total one hundred percent are entered as sets of simple percentages.

As discussed, inputs to the control flow graph may include the flow graph itself, branching percentages, and threat counts. The control flow graph may be drawn by the user, or adapted from a pre-existing template, employing a graph-builder user interface, as discussed above. Each node of the control flow graph may be given a label (e.g., the name of the corresponding control) and may be connected with directed edges to successor nodes. Each control flow graph is designed for a specific type of risk and threat. The branching percentages specify, for each control/node with multiple successors, the percentage breakdown of outgoing threat flow among the successors. In one example, outbound threat flow for any control/node must total one hundred percent. The threat count comprises a range approximation of the expected total count of threats entering the organization on a periodic (e.g., daily) basis.

Each individual node may be further associated with a further set of inputs, including detection strength, allow-alert percentage, confidence, stage, and business asset value. Detection strength comprises the percentage of threats entering from predecessor controls (nodes) that are expected to be detected by the current control. For a blocking-only control, detection is equivalent to eradication; for a detection-response control, detection>eradication. Allow-alert percentage comprises the percentage of detected threats (per detection strength) for which the control is expected to allow the suspicious activity to continue, but send an alert to the SOC. In one example, for a detection-response control, the allow-alert percentage is greater than zero percent; for a blocking-only control, the allow-alert percentage is equal to zero; for an alert-only control (which never blocks), the allow-alert percentage is equal to one hundred percent.

For detection-response controls, confidence comprises the strength of the control's generated alerts with respect to actionability, defined by extreme boundary values that do not occur in practice, namely: (1) a confidence of one hundred percent indicates that one hundred percent of alerts generated represent fully actionable, genuine (true positive), critical threats, with no possibility of false positives or non-critical alerts; and (2) a confidence of zero percent indicates that one hundred percent of generated alerts are impossible to correlate with a genuine threat and are indistinguishable from false positives.

Stage comprises the position of a control with respect to the control flow graph. Early stages occur toward the left of the control flow graph and reflect initial entry of a threat activity and beginning steps in the threat's progress toward its objective. Later stages reflect activity successively further toward the right of the control flow graph, approaching the accomplishment of threat objectives. The number of stages may be an additional input parameter. Any control may straddle one or more stages, meaning that the control's threat detection may occur at different points in the progress of a threat activity. Stage may be entered as a set of percentages which total one hundred percent.

Business asset value comprises the level of criticality to the organization of assets potentially compromised or business processes potentially disrupted by a detected threat, as viewed by controls at various stages of the control flow graph. The number of asset value tiers may be an additional input parameter.

In one example, SOC inputs include SOC analytic strength, false positive exponent coefficient, factor weightings for case priority, SOC analyst resource and alert correlation. SOC analytic strength comprises a zero to one hundred percent measure of security information and event management (SIEM), security orchestration, automation, and response (SOAR), and other SOC software tools' abilities to correlate and consolidate alerts and events to reduce false positives and increase strength and actionability of cases queued for analysts.

The false positive exponent coefficient is based on the assumption that the volume of false positives may increase super-linearly as the confidence strength of a control declines. In one example, the model calculates false positive volume as an exponential function of the confidence weakness (i.e., arithmetic inverse of confidence strength). In one example, the false positive exponent coefficient allows the user to set the degree of the exponential function.

The factor weight for case priority comprises a user-specified vector of relative weight values for each factor in the SOC case priority computation. In one example, there are three factors accompanying each alert (i.e., confidence strength, stage, and asset value) and respectively three weights which are small positive integers. The highest range of priorities may be assigned according to the highest-order (highest weight) factor(s); lower weight factors determine priority ordering only within a higher-order range.

The SOC analyst resource may be specified as a range approximation of the number of high-confidence cases that the SOC analysts are able to process and resolve in a standard time period.

Alert correlation, defined as the AlertCorrelation input variable above, sets the expected correlation among multiple alerts and blocks with respect to specific threats flowing through paths in the control flow graph.

Examples of the present disclosure may be applicable to a variety of use cases. For instance, examples of the present disclosure may be used to guide the selection of optimal defense strategies against specific threats, or to determine which of two or more potential defense strategies are likely to be more effective (e.g., is a new secure email gateway or a next-generation endpoint agent a more effective defense against phishing; is multi-factor authentication or improved email action policies more effective against business email compromise; is a secure email gateway in combination with anti-phishing decoy training or a next-generation endpoint agent more effective against ransomware; is an enhanced host endpoint agent or additional SOC analyst resources more effective against malware.

Examples of the present disclosure may also be useful for assessing the potential value of proposed control investments like data at rest encryption, network packet (data on the fly) encryption, strengthened (e.g., multi-factor or biometric) authentication, strengthened identity management (e.g., employee/contractor offboarding process), data loss prevention software, additional SOC (e.g., human analyst) resources, and the like.

Examples of the present disclosure may also be used to assess overall cyber resilience (e.g., relative to insider threats, to breach of customer data, to business disruption, and the like).

FIG. 13 depicts a high-level block diagram of a computing device specifically programmed to perform the functions described herein. For example, any one or more components or devices illustrated in FIG. 1 or described in connection with the method 200 may be implemented as the system 1300. For instance, a user endpoint device or an application server (such as might be used to perform the method 200) could be implemented as illustrated in FIG. 13.

As depicted in FIG. 13, the system 1300 comprises a hardware processor element 1302, a memory 1304, a module 1305 for cyber risk minimization, and various input/output (I/O) devices 1306.

The hardware processor 1302 may comprise, for example, a microprocessor, a central processing unit (CPU), or the like. The memory 1304 may comprise, for example, random access memory (RAM), read only memory (ROM), a disk drive, an optical drive, a magnetic drive, and/or a Universal Serial Bus (USB) drive. The module 1305 for cyber risk minimization may include circuitry and/or logic for performing special purpose functions relating to assessing and minimizing cyber risk. The input/output devices 1306 may include, for example, a camera, a video camera, storage devices (including but not limited to, a tape drive, a floppy drive, a hard disk drive or a compact disk drive), a receiver, a transmitter, a speaker, a microphone, a transducer, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 1305 for cyber risk minimization (e.g., a software program comprising computer-executable instructions) can be loaded into memory 1304 and executed by hardware processor element 1302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 1305 for cyber risk minimization (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
constructing, by a processing system including at least one processor, a control flow graph that represents a plurality of controls, wherein each control of the plurality of controls comprises a measure taken by an organization to counter threats to an information technology infrastructure of the organization;
calculating, by the processing system and for each path of a plurality of paths through the control flow graph, a metric that quantifies an efficacy of a subset of the plurality of controls along the each path in countering the threats, wherein the calculating results in a plurality of metrics being calculated for the plurality of paths;
constructing, by the processing system, a threat strength distribution comprising a statistical distribution of observed strengths of the threats;
generating, by the processing system, a statistical visualization of an efficacy of at least one combination of the plurality of controls, based on the plurality of metrics, the control flow graph, and the threat strength distribution;
identifying, by the processing system and based on the statistical visualization, a weakness in the plurality of controls; and
modifying, by the processing system, the plurality of controls based on the identifying, in order to address the weakness.

2. The method of claim 1, wherein the control flow graph comprises:
a plurality of nodes; and
a plurality of directed edges connecting the plurality of nodes.

3. The method of claim 2, wherein the plurality of nodes comprises:
a start node representing the threats;
an end node representing a subset of the threats that is successful; and
a plurality of intermediate nodes positioned between the start node and the end node, wherein each intermediate node of the plurality of intermediate nodes represents a control of the plurality of controls.

4. The method of claim 3, wherein a first directed edge of the plurality of directed edges connects a first intermediate node of the plurality of intermediate nodes and a second intermediate node of the plurality of intermediate nodes points that occurs later than the first intermediate node, and wherein the first directed edge points to the second intermediate node.

5. The method of claim 3, wherein a first intermediate node of the plurality of intermediate nodes is connected to a second intermediate node of the plurality of intermediate nodes by a first directed edge of the plurality of directed edges, and is connected to a third intermediate node of the plurality of intermediate nodes by a second directed edge of the plurality of directed edges.

6. The method of claim 5, wherein the first directed edge is annotated to indicate a first percentage of an outgoing threat flow from the first intermediate node that flows to the second intermediate node, and wherein the second directed edge is annotated to indicate a second percentage of the outgoing threat flow from the first intermediate node that flows to the third intermediate node.

7. The method of claim 1, further comprising:
validating a model that includes the control flow graph and the threat strength distribution prior to the identifying.

8. The method of claim 1, wherein the threats comprise attack sequences and methods employed by perpetrators of specified classes of cyber incidents.

9. The method of claim 8, wherein the statistical distributions are further indicative of levels of sophistication of the perpetrators of the specified classes of cyber incidents.

10. The method of claim 1, wherein the metric quantifies at least one of: a strength of the subset of the plurality of controls relative to detecting the threats, a strength of threat context analytics, and an effect of an interaction of each control of the subset with other controls of the subset.

11. The method of claim 1, wherein the control flow graph comprises measures of at least one of: a strength of software analytics, an adequacy of human analyst resources, and an effectiveness of resource scheduling.

12. The method of claim 1, wherein the modifying comprises implementing a remediation strategy to strengthen the weakness.

13. The method of claim 12, wherein the modifying comprises:
evaluating a plurality of potential remediation strategies for respective efficacies in strengthening the weakness, wherein the remediation strategy is selected from among the plurality of potential remediation strategies.

14. The method of claim 1, wherein the statistical visualization comprises a path analysis that visually indicates a failure of a control of the plurality of controls to eradicate a threat of the threats.

15. The method of claim 1, wherein the statistical visualization comprises increasing and decreasing a strength of at least one control of the plurality of controls to assess an impact of the at least one control on an aggregate strength of the plurality of controls.

16. The method of claim 1, wherein the statistical visualization comprises a prediction of an impact of an enhancement to at least one control of the plurality of controls.

17. The method of claim 1, wherein the threat strength distribution is embodied by a probability density function which is graphically shown as a curve with a corresponding threat continuum on an x-axis of the curve and relative probability on a y-axis of the curve.

18. The method of claim 1, wherein an input parameter of the each control indicates a degree of correlation between the each control and at least one other control of the plurality of controls.

19. A non-transitory computer readable storage medium storing instructions which, when executed by a processing system including at least one processor, cause the processing system to perform operations comprising:
constructing a control flow graph that represents a plurality of controls, wherein each control of the plurality of controls comprises a measure taken by an organization to counter threats to an information technology infrastructure of the organization;
calculating, for each path of a plurality of paths through the control flow graph, a metric that quantifies an efficacy of a subset of the plurality of controls along the each path in countering the threats, wherein the calculating results in a plurality of metrics being calculated for the plurality of paths;
constructing a threat strength distribution comprising a statistical distribution of observed strengths of the threats;
generating a statistical visualization of an efficacy of at least one combination of the plurality of controls, based on the plurality of metrics, the control flow graph, and the threat strength distribution;
identifying, based on the statistical visualization, a weakness in the plurality of controls; and
modifying the plurality of controls based on the identifying, in order to address the weakness.

20. A device, comprising:
a processing system including at least one processor; and
a non-transitory computer readable storage medium storing instructions which, when executed by the processing system, cause the processing system to perform operations comprising:
constructing a control flow graph that represents a plurality of controls, wherein each control of the plurality of controls comprises a measure taken by an organization to counter threats to an information technology infrastructure of the organization;
calculating, for each path of a plurality of paths through the control flow graph, a metric that quantifies an efficacy of a subset of the plurality of controls along the each path in countering the threats, wherein the calculating results in a plurality of metrics being calculated for the plurality of paths;
constructing a threat strength distribution comprising a statistical distribution of observed strengths of the threats;
generating a statistical visualization of an efficacy of at least one combination of the plurality of controls, based on the plurality of metrics, the control flow graph, and the threat strength distribution;
identifying, based on the statistical visualization, a weakness in the plurality of controls; and
modifying the plurality of controls based on the identifying, in order to address the weakness.

* * * * *